US011277303B1

(12) United States Patent
Srinivasan et al.

(10) Patent No.: US 11,277,303 B1
(45) Date of Patent: Mar. 15, 2022

(54) DECLARATIVE SPECIFICATION BASED OVERRIDE MECHANISM FOR CUSTOMIZING DATA CENTERS DEPLOYED ON CLOUD PLATFORMS

(71) Applicant: salesforce.com, inc., San Francisco, CA (US)

(72) Inventors: Sriram Srinivasan, Milpitas, CA (US); Joshua Paul Meier, Concord, CA (US); Varun Gupta, Berkeley, CA (US); Mayakrishnan Chakkarapani, Fremont, CA (US); Neil Natarajan, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 17/307,913

(22) Filed: May 4, 2021

(51) Int. Cl.
*H04L 12/24* (2006.01)
*H04L 41/0803* (2022.01)
*G06F 16/9035* (2019.01)
*H04L 67/10* (2022.01)

(52) U.S. Cl.
CPC ...... *H04L 41/0803* (2013.01); *G06F 16/9035* (2019.01); *H04L 67/10* (2013.01)

(58) Field of Classification Search
CPC .. H04L 41/0803; H04L 67/10; G06F 16/9035
See application file for complete search history.

(56) References Cited

U.S. PATENT DOCUMENTS

| | | | | |
|---|---|---|---|---|
| 8,051,028 B2* | 11/2011 | Karnik | ................ | G06F 9/44505 706/48 |
| 9,680,696 B1* | 6/2017 | Firment | ................ | H04L 41/14 |
| 2021/0203550 A1* | 7/2021 | Thakkar | ................ | H04L 67/141 |

OTHER PUBLICATIONS

Burns, E., "Why Spinnaker matters to CI/CD," Aug. 27, 2019, ten pages, [Online] [Retrieved on Jun. 25, 2021] Retrieved from the Internet <URL: https://opensource.com/article/19/8/why-spinnaker-matters-cicd>.

Mukherjee, J., "Continuous delivery pipeline 101: What is a continuous delivery pipeline?," Date Unknown, 14 pages, [Online] [Retrieved on Jun. 25, 2021] Retrieved from the Internet <URL: https://www.atlassian.com/continuous-delivery/pipeline>.

Thakur, V., "Continuous Delivery Pipeline for Kubernetes Using Spinnaker," May 27, 2020, 21 pages, [Online] [Retrieved on Jun. 25, 2021] Retrieved from the Internet <URL: https://www.metricfire.com/blog/continuous-delivery-pipeline-for-kubernetes-using-spinnaker/?GAID=undefined>.

* cited by examiner

*Primary Examiner* — Kim T Nguyen
(74) *Attorney, Agent, or Firm* — Fenwick & West LLP

(57) ABSTRACT

Computing systems, for example, multi-tenant systems create data centers in a cloud platform using a cloud platform infrastructure language that is cloud platform independent. The system receives a cloud platform independent declarative specification describing a new datacenter to be created and a customization specification for customizing the data center. The system compiles the declarative specification along with the customization specification to generate a metadata representation of the data center. The metadata representation is used to generate a data center on a target cloud platform. Different customization specifications can be provided to generate different customized datacenters based on the same declarative specification. For example, the different customized data centers may implement different policies, for example, network policies, security policies, and so on.

20 Claims, 15 Drawing Sheets

DECLARATIVE SPECIFICATION BASED OVERRIDE MECHANISM FOR CUSTOMIZING DATA CENTERS DEPLOYED ON CLOUD PLATFORMS

BACKGROUND

Field of Art

This disclosure relates in general to cloud computing platforms, and in particular to an override mechanism based on a declarative language and compiler for customizing data centers created in cloud computing platforms.

Description of the Related Art

Organizations are increasingly replying on cloud computing platforms (or cloud platforms) such as AWS (AMAZON WEB SERVICES), GOOGLE cloud platform, MICROSOFT AZURE, and so on for their infrastructure needs. Cloud platforms provide servers, storage, databases, networking, software, and so on over the Internet to organizations. Conventionally, organizations maintained data centers that house hardware and software used by the organization. However, maintaining data centers can result in significant overhead in terms of maintenance, personnel, and so on. As a result, organizations are shifting their data centers to cloud platforms that provide scalability and elasticity of computing resources.

A system such as a multi-tenant system may have to maintain several thousand such data centers on a cloud platform. Since each data center may require millions of lines of code, maintaining such data centers can be a complex task. Furthermore, the software, languages, features supported by each cloud platform may be different. For example, different cloud platforms may support different mechanism for implementing network policies or access control. Furthermore, network policies supported by a particular cloud platform may not be supported by another cloud platform. As a result, a multi-tenant system has to maintain different implementations of data centers, depending on the number of tenants that customize the data center configurations and the number of cloud platforms that are supported. More specifically, there can be several different sets of instructions for different data centers and data center entities that have variations. Such instructions can be cumbersome to maintain and are likely to introduce errors. This results in high maintenance cost for supporting such data centers.

Figure 1:
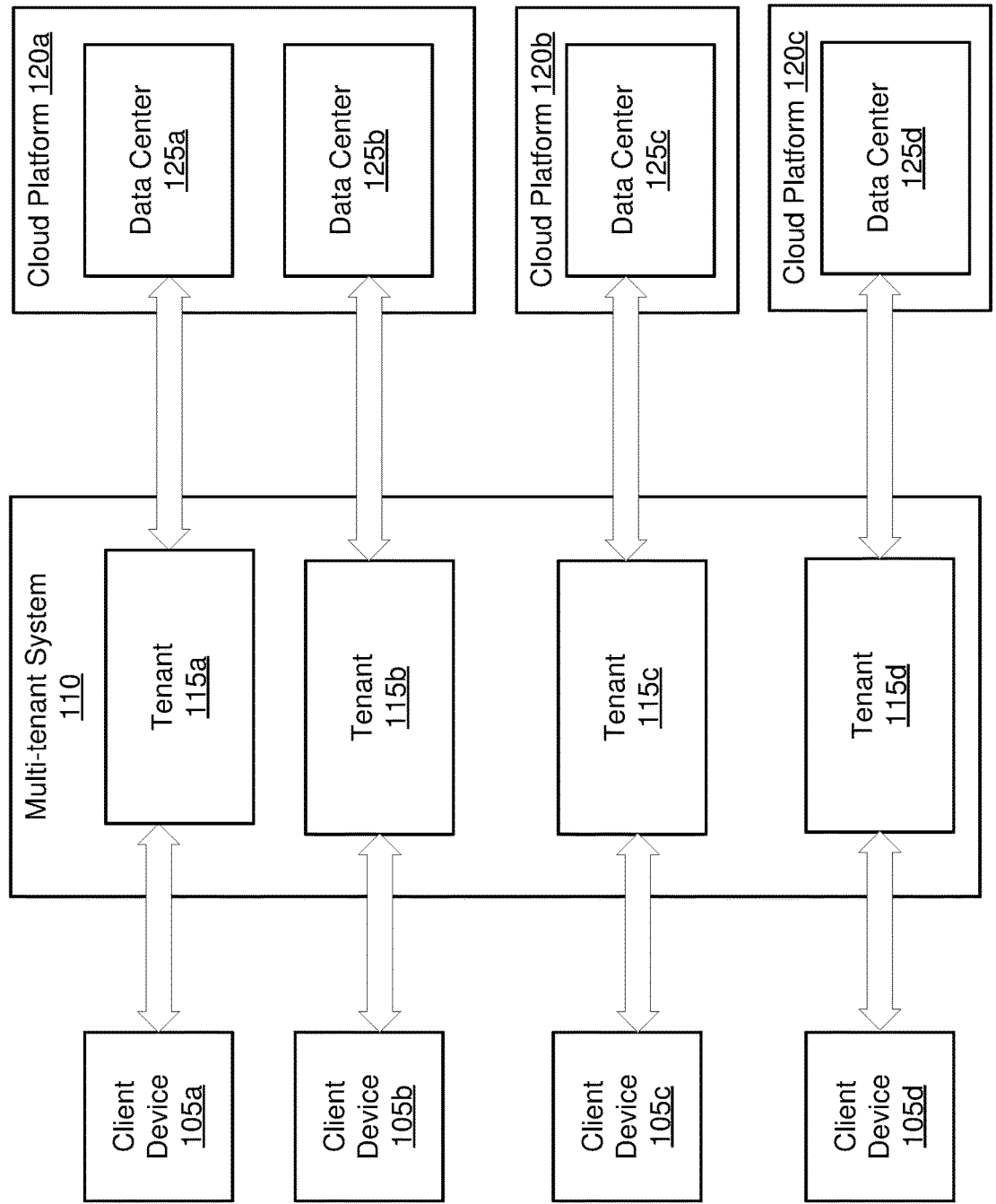
FIG. 1 is a block diagram of a system environment illustrating a multi-tenant system configuring data centers on cloud platforms according to an embodiment.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115a," indicates that the text refers specifically to the element having that particular reference numeral. A reference numeral in the text without a following letter, such as "115," refers to any or all of the elements in the figures bearing that reference numeral.

DETAILED DESCRIPTION

Cloud platforms provide computing resources, such as storage, computing resources, applications, and so on to computing systems on an on-demand basis via a public network such as internet. Cloud platforms allow enterprises to minimize upfront costs to set up computing infrastructure and also allow enterprises to get applications up and running faster with less maintenance overhead. Cloud platforms also allow enterprises to adjust computing resources to rapidly fluctuating and unpredictable demands. Enterprises can create a data center using a cloud platform for use by users of the enterprise. However, implementing a data center on each cloud platform requires expertise in the technology of the cloud platform.

Embodiments allow computing systems (or systems) to create data centers in a cloud platform using a cloud platform infrastructure language that is cloud platform independent. The system receives a cloud platform independent declarative specification of a data center. The declarative specification describes the data center and may not provide instructions for creating the data center. The cloud platform independent declarative specification is configured to generate the data center on any of a plurality of cloud platforms and is specified using a cloud platform infrastructure language. The system receives information identifying a target cloud platform for creating the data center. The system compiles the cloud platform independent declarative specification to generate a cloud platform specific data center representation. The system sends the platform specific data center representation and a set of instructions for execution on the target cloud platform. The target cloud platform executes the instructions to configure the data center using the platform specific data center representation. The system provides users with access to the computing resources of the data center configured by the cloud platform.

In an embodiment, the system generates customized data centers on a cloud platform. The system receives a declarative specification of a data center. The declarative specification specifies at least a set of data center entities that may be of one or more data center entity types and have at least a particular attribute, for example, attribute A. The system receives a customization specification for the data center that defines: (1) a filtering criterion based on characteristics of data center entities of the set, and (2) a modified value of the particular attribute. The system compiles the declarative specification in combination with the customization specification to generate a cloud platform specific data center representation for creating the data center on a target cloud platform. The system sends the cloud platform specific data center representation to the target cloud platform. The target cloud platform configures the data center using the cloud platform specific data center representation such that: (1) the datacenter entities that satisfy the filtering criterion have the particular attribute according to the customization specification, and (2) the datacenter entities that fail to satisfy the filtering criterion have the particular attribute according to the declarative specification.

A cloud platform is also referred to herein as a substrate. The declarative specification of data center is substrate independent or substrate agnostic, whereas the cloud platform specific data center representation is substrate specific. The declarative specification of a data center may also be referred to herein as a cloud platform independent declarative specification. If a data center is created using conventional techniques, the user has to provide cloud platform specific instructions for creating each data center entity. Accordingly, the user needs to knowledge of how to create each data center entity for a cloud platform. Furthermore, the instructions are cloud platform specific and are not portable across multiple platforms. For example, the instructions for creating a data center or a data center entity on an AWS cloud platform are different from instructions for creating the same data center or data center entity on a GCP cloud platform. A developer creating a data center on each cloud platform has to understand the details of how each data center entity and feature is implemented on that specific cloud platform. The system disclosed provides a cloud platform infrastructure language that allows users to describe the data center that they want to create in any cloud platform selected from a plurality of cloud platforms. A compiler of the cloud platform infrastructure language generates a cloud platform specific detailed metadata representation of the data center and creates the data center on a target cloud platform.

The cloud platform infrastructure language may be referred to as a domain specific language (DSL) for creating data centers. The system may represent a multi-tenant system but is not limited to multi-tenant systems and can be any online system or any computing system with network access to the cloud platform.

Overall System Environment

FIG. 1 is a block diagram of a system environment illustrating a multi-tenant system configuring data centers on cloud platforms according to an embodiment. The system environment 100 comprises a multi-tenant system 110, one or more cloud platforms 120, and one or more client devices 105. In other embodiments, the system environment 100 may include more or fewer components.

The multi-tenant system 110 stores information of one or more tenants 115. Each tenant may be associated with an enterprise that represents a customer of the multi-tenant system 110. Each tenant may have multiple users that interact with the multi-tenant system via client devices 105. With the multi-tenant system 110, data for multiple tenants may be stored in the same physical database. However, the database is configured so that data of one tenant is kept logically separate from that of other tenants so that one tenant does not have access to another tenant's data, unless such data is expressly shared. It is transparent to tenants that their data may be stored in a table that is shared with data of other customers. A database table may store rows for a plurality of tenants. Accordingly, in a multi-tenant system, various elements of hardware and software of the system may be shared by one or more tenants. For example, the multi-tenant system 110 may execute an application server that simultaneously processes requests for a number of tenants. However, the multi-tenant system enforces tenant-level data isolation to ensure that jobs of one tenant do not access data of other tenants.

A cloud platform may also be referred to as a cloud computing platform or a public cloud environment. A tenant may use the cloud platform infrastructure language to provide a declarative specification of a data center that is created on a target cloud platform 120. A tenant 115 may create one or more data centers on a cloud platform 120. A data center represents a set of computing resources including servers, applications, storage, memory, and so on that can be used by users, for example, users associated with the tenant.

The computing resources of a data center are secure and may not be accessed by users that are not authorized to access them. For example, a data center 125a that is created for users of tenant 115a may not be accessed by users of tenant 115b unless access is explicitly granted. Similarly, data center 125b that is created for users of tenant 115b may not be accessed by users of tenant 115a, unless access is explicitly granted. Furthermore, services provided by a data center may be accessed by computing systems outside the data center, only if access is granted to the computing systems in accordance with the declarative specification of the data center.

Examples of cloud platforms include AWS (AMAZON web services), GOOGLE cloud platform, or MICROSOFT AZURE. A cloud platform 120 offers computing infrastructure services that may be used on demand by a tenant 115 or by any computing system external to the cloud platform 120. Examples of the computing infrastructure services offered by a cloud platform include servers, storage, databases, networking, security, load balancing, software, analytics, intelligence, and other infrastructure service functionalities. These infrastructure services may be used by a tenant 115 to build, deploy, and manage applications in a scalable and secure manner.

The multi-tenant system 110 may include a tenant data store that stores data for various tenants of the multi-tenant store. The tenant data store may store data for different tenants in separate physical structures, for example, separate database tables or separate databases. Alternatively, the tenant data store may store data of multiple tenants in a shared structure. For example, user accounts for all tenants may share the same database table. However, the multi-tenant system stores additional information to logically separate data of different tenants.

Each component shown in FIG. 1 represents one or more computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc. Each computing device stores software modules storing instructions.

The interactions between the various components of the system environment 100 are typically performed via a network, not shown in FIG. 1. In one embodiment, the network uses standard communications technologies and/or protocols. In another embodiment, the entities can use custom and/or dedicated data communications technologies instead of, or in addition to, the ones described above.

Although the techniques disclosed herein are described in the context of a multi-tenant system, the techniques can be implemented using other systems that may not be multi-tenant systems. For example, an online system used by a single organization or enterprise may use the techniques disclosed herein to create one or more data centers on one or more cloud platforms 120.

System Architecture

Figure 2:
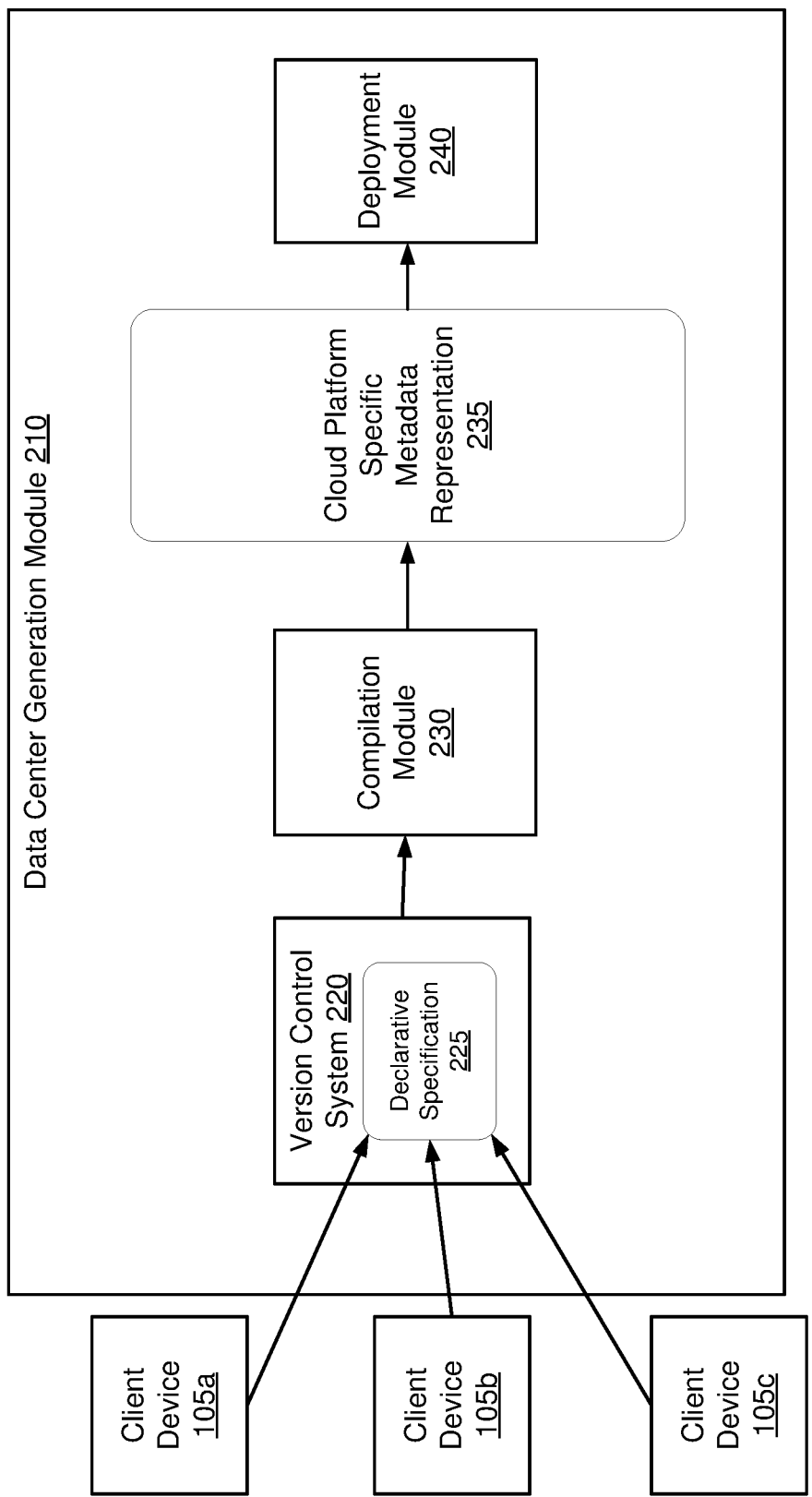
FIG. 2 is a block diagram illustrating the system architecture of a data center generation module according to an embodiment.

FIG. 2 is a block diagram illustrating the system architecture of a data center generation module according to an embodiment. The data center generation module 210 comprises a version control system 220, a compilation module 230, and a deployment module 240. Other embodiments can have different and/or other components than the ones described here, and that the functionalities can be distributed among the components in a different manner.

The version control system 220 stores one or more versions of a platform independent declarative specification 225 of a data center. The platform independent declarative specification 225 of a data center specifies various entities of the data center including the services available in the data center and their interactions. Expert users may modify the platform independent declarative specification, for example, using applications executing on client devices 105. The modifications to the platform independent declarative specification may be submitted via commit requests of the version control system 220. The version control system 220 allows users to create snapshots of the platform independent declarative specification at various stages of modifications, thereby allowing users to rollback certain changes and apply a previous version of the platform independent declarative specification.

The compilation module 230 receives the platform independent declarative specification 225 and a target cloud platform as input and generates a cloud platform specific metadata representation 235 for the target cloud platform. The architecture of the compilation module 230 and processes executed by the compilation module 230 are described in further detail herein, for example, in the description of FIG. 3. The deployment module 240 deploys the generated cloud platform specific metadata representation 235 on the target cloud platform to create a data center on the target cloud platform according to the declarative specification 225.

Figure 3:
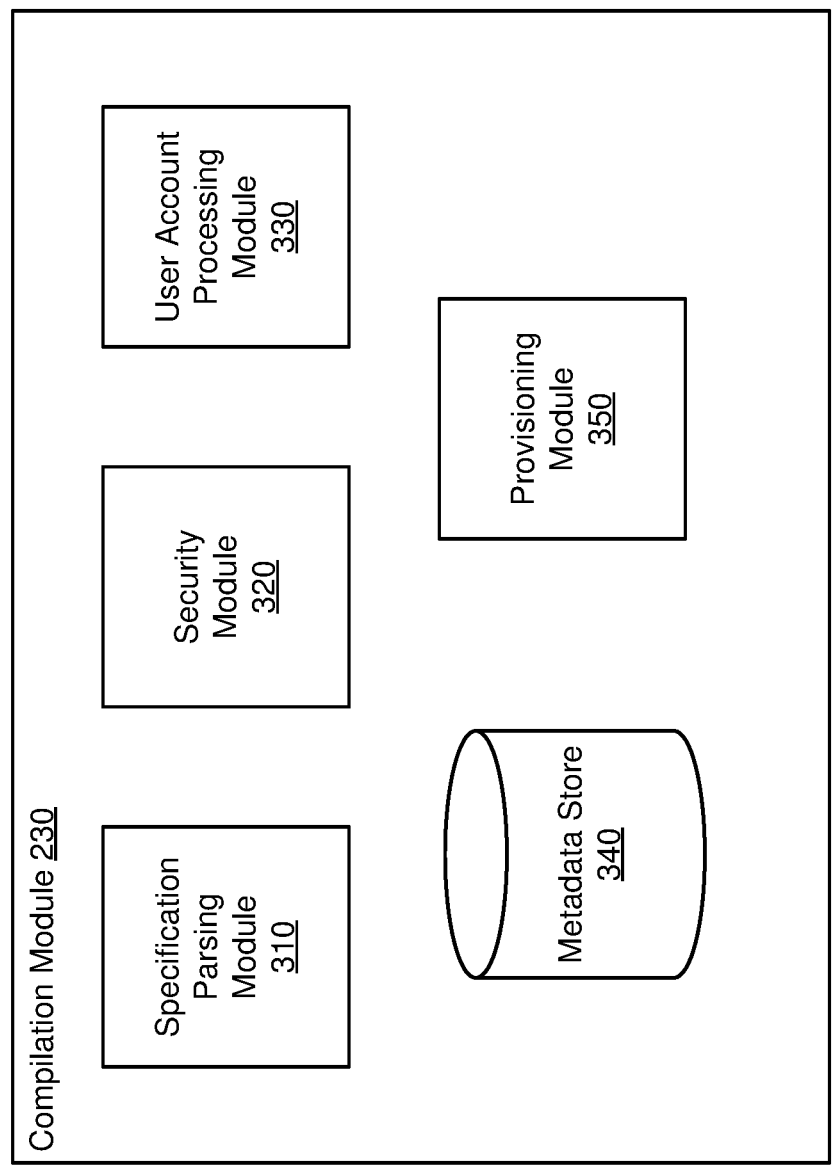
FIG. 3 is a block diagram illustrating the architecture of a compilation module according to one embodiment.

FIG. 3 is a block diagram illustrating the architecture of a compilation module according to one embodiment. The compilation module 230 includes a specification parsing module 310, a security module 320, a user account processing module 330, a metadata store 340, and a provisioning module 350. Other embodiments may include more, fewer, or different modules than those indicated herein in FIG. 3.

The specification parsing module 310 parses a declarative specification 225 of a data center received as input by the compilation module 230. The specification parsing module 310 identifies individual data center entities represented within the declarative specification 225 of the data center. The specification parsing module 310 generates data structures and metadata representations of the data center entities and provides the generated data structures and metadata representations to other modules of the compilation module 230 for further processing.

The security module 320 handles security aspects of various data center entities that are specified in the declarative specification 225 of the data center. For example, the security module 320 ensures that interactions within various data center entities, interactions of data center entities with systems outside the data center generated conform to security policies specified within the declarative specification 225 of the data center. The security policy may specify which data center entities can be accessed by external systems, which external system may be accessed by specific data center entities, whether a service can interact with another service, whether a service group can interact with another service group, whether a service can access a specific functionality or API (application programming interface) supported by the cloud platform, and so on. An external system may be identified using an IP address or domain name.

The user account processing module 330 creates user accounts in the cloud platforms where the data center is being created. These user accounts are used for various purposes, for example, for debugging, simulation of data center, for interaction with team members and so on.

The metadata store 340 stores various transformed metadata representations of data centers that are generated by the compilation module 230. The transformed metadata representations may be used for performing rollback to a previous version if an issue is encountered in a current version of the data center. The transformed metadata representations may be used for validation, auditing, governance, and so on at various stages of the transformation process.

The provisioning module 350 creates instructions for provisioning resources on target cloud systems and executes them for deploying the data center. In an embodiment, the provisioning system creates pipelines for executing on the cloud platform. The pipelines comprise stages that include instructions for provisioning services or deploying applications for creating various services on the cloud platform according to the declarative specification describing the data center.

Figure 4:
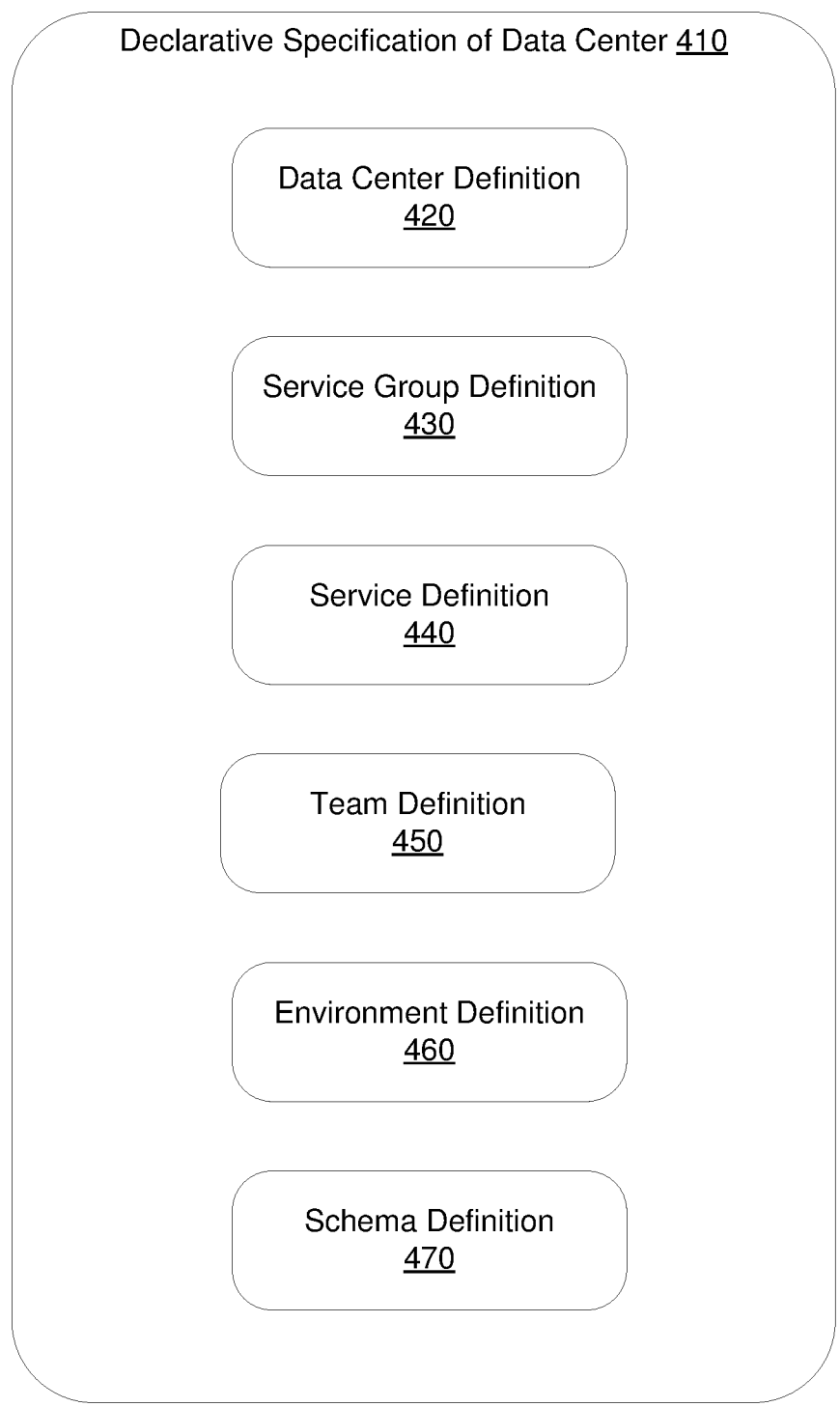
FIG. 4 illustrates an example of a data center declarative specification according to one embodiment.

FIG. 4 illustrates an example of a declarative specification of a data center according to one embodiment. The declarative specification 410 includes multiple data center entities. A data center entity is an instance of a data center entity type and there can be multiple instances of each data center entity type. Examples of data center entities include data centers, service groups, services, teams, environments, and schemas.

The declarative specification 410 includes definitions of various types of data center entities including service group, service, team, environment, and schema. The declarative specification includes one or more instances of data centers. Following is a description of various types of data center entities and their examples. The examples are illustrative and show some of the attributes of the data center entities. Other embodiments may include different attributes and an attribute with the same functionality may be given a different name than that indicated herein. In an embodiment, the declarative specification is specified using hierarchical objects, for example, JSON (Javascript object notation) that conform to a predefined schema.

A service group 420 represents a set of capabilities and features and services offered by one or more computing systems that can be built and delivered independently, in accordance with one embodiment. A service group may be also referred to as a logical service group, a functional unit, or a bounded context. A service group 420 may also be viewed as a set of services of a set of cohesive technical use-case functionalities offered by one or more computing systems. A service group 420 enforces security boundaries. A service group 420 defines a scope for modifications. Thus, any modifications to an entity, such as a capability, feature, or service offered by one or more computing systems within a service group 420 may propagate as needed or suitable to entities within the service group, but does not propagate to an entity residing outside the bounded definition of the service group 420. A data center may include multiple service groups 420. A service group definition specifies attributes including a name, description, an identifier, schema version, and a set of service instances. An example of a service group is a blockchain service group that includes a set of services used to providing blockchain functionality. Similarly, a security service group provides security features. A user interface service group provides functionality of specific user interface features. A shared document service group provides functionality of sharing documents across users. Similarly, there can be several other service groups.

Service groups support reusability of specification so that tenants or users interested in developing a data center have a library of service groups that they can readily use. The boundaries around services of a service groups are based on security concerns and network concerns among others. A service group is associated with protocols for performing interactions with the service group. In an embodiment, a service group provides a collection of APIs (application programming interfaces) and services that implement those APIs. Furthermore, service groups are substrate independent. A service group provides a blast radius scope for the services within the service group so that any failure of a service within the service group has impact limited to services within the service group and has minimal impact outside the service group.

Following is an example of a specification of a service group. The service group specifies various attributes representing metadata of the service group and includes a set of services within the service group. There may be other types of metadata specified for a service group, not indicated herein.

```
{
  "service_group": [
    {
      "cells": [ ],
      "description": "Service group Service Instance Definitions",
      "service_group_id": "id1",
      "name": "name1",
      "schema_version": "1.0",
      "cluster_instances": [
        {
          "cluster_instance_name": "cluster1",
          "cluster_type": "cluster_type1"
        },
        {
          "cluster_instance_name": "cluster2",
          "cluster_type": "cluster_type1"
        },
        {
          "cluster_instance_name": "cluster3",
          "cluster_type": "cluster_type2"
        }
      ],
      "service_instances": [
        {
          "service_instance_name": "serviceinstance0001",
          "service_type": "servicetype1"
        },
        {
          "service_instance_name": "serviceinstance0002",
          "service_type": "servicetype1"
          "cluster_instance": "cluster1"
        },
        {
          "service_instance_name": "serviceinstance0003",
          "service_type": "servicetype2"
        },
        ...
      ],
      "service_teams": ["team1"],
      "type": "servicetype"
      "security_groups":[
        {
          "name":"group1",
          "policies":[
            {
              "description":"Allow access from site S1",
              "destination":{ "groups":[ "group2" ]
              "environments":[ "dev", "test", "staging" ],
              "source":{
                "iplist":"URL1",
                "filters":[ filter-expression ]
              }
            }
          ]
        }
      ]
    }
  ]
}
```

As shown in the example above, a service group may specify a set of clusters. A cluster represents a set of computing nodes, for example, a set of servers, a set of virtual machines, or a set of containers (such as KUBERNETES containers). A physical server may run multiple containers, where each container has its own share of filesystem, CPU, memory, process space, and so on.

The service group specifies a set of services. A service group may specify a cluster for a service so that the data center deployed on a cloud platform runs clusters of computing nodes and maps the services to clusters based on the specified mapping if included in the declarative specification. For example, in the service group example shown above, the service instance serviceinstance0002 is specified to run on cluster instance cluster1.

The service group may specify security groups, each security group specifying a set of services that are allowed to interact with each other. Services outside the security group are required to pass additional authentication to communicate with services within the security group. Alternatively, the services within a security group use one protocol to interact with each other and services outside the security group use a different protocol that requires enhances authentication to interact with services within the security group. Accordingly, a security group specifies policies that determine how services can interact with each other. A security policy may specify one or more environments for which the security policy is applicable. For example, a security policy policy1 may apply to a particular environment env1 (e.g., production environment) and another security policy policy2 may apply to another environment env2 (e.g., development environment). A security policy may be specified for a service group type or for a specific service type.

In an embodiment, the security policy specifies expressions for filtering the service groups based on various attributes so that the security policy is applicable to the filtered set of service groups. For example, the security policy may specify a list of IP (internet protocol) addresses that are white listed for a set of service groups identified by the filtered set and accordingly these computing systems are allowed access to the service group or to specific set of services within the service group.

In an embodiment, a security policy may specify for a service group, a set of source services and a set of destination services. The source services for a particular service specify the services outside the security group that are allowed to connect with this particular service. The destination services for a particular service specify the services outside the security group that this particular service needs to connect to. During provisioning and deployment, the data center generation module generates instructions for the cloud platform that implement specific network policies using cloud platform specific features and network functionality such that the network policies implement the security policies specified in the declarative specification.

A data center entity called a cell represents a set of services that interact with each other in a vertical fashion and can be scaled by additional instances or copies of the cell, i.e., copies of the set of services. Creating multiple instances of a cell allows a system to scale a set of services that interact with each other. A data center instance may include one or more cells. Each cell may include one or more services. A data center may include instances of service groups or cells.

A service definition specifies metadata for a type of service, for example, database service, load balancer service, and so on. The metadata be describe various attributes of a service including a name of the service, description of the service, location of documentation for the service, any sub-services associated with the service, an owner for the service, a team associated with the service, build dependencies for the service specifying other services on which this service depends at build time, start dependencies of the service specifying the other services that should be running when this particular service is started, authorized clients, DNS (domain name server) name associated with the service, a service status, a support level for the service, and so on. The service definition specifies a listening ports attribute specifying the ports that the service can listen on for different communication protocols, for example, the service may listen on a port p1 for UDP protocol and a port p2 for TCP protocol. Other services within the data center can interact with a service via the ports specified by the service.

The service definition specifies an attribute outbound access that specifies destination endpoints, for example, external URLs (uniform resource locators) specifying that the service needs access to the specified external URLs. During deployment, the data center generation module ensures that the cloud platform implements access policies such that instances of this service type are provided with the requested access to the external URLs.

The outbound access specification may identify one or more environment types for the service for which the outbound access is applicable. For example, an outbound access for a set of endpoints S1 may apply to a particular environment env1 (e.g., production environment) and outbound access for a set of endpoints S2 may apply to another environment env2 (e.g., development environment).

Following is an example of a service definition.

```
{
    "service definition": [
        {
            "authorized_clients": [ ],
            "build_dependencies": [ ],
            "description": "description of service",
            "dns_name": "dns1",
            "documentation": "URL",
            "name": "name1",
            "namespace": "space1",
            "service_owner": "user1",
            "service_status": "GA",
            "service_team": "team1",
            "support_level": "STANDARD",
            "start_dependencies": ["svc5", "svc7", ...],
            "sub_services": ["service1", "service2", "service3", ... ],
            "listening_ports":[
                    {"protocol":"tcp", "ports":[ "53" ] },
                    {"protocol":"udp","ports":[ "53" ] }
                "outbound_access":[
                    {
                        "destination":[
                            {
                                "endpoints":[ ".xyz.com:443", ".pqr.com:443" ]
                            }
                        ]
                    }
                ],
        }
    ]
}
```

A team definition 450 includes team member names and other attributes of a team for example, name, email, communication channel and so on. Following is an example of a team definition. A service may be associated with one or more teams that are responsible to modifications made to that service. Accordingly, any modification made to that service is approved by the team. A service may be associated with a team responsible for maintenance of the service after it is deployed in a cloud platform. A team may be associated with a service group and is correspondingly associated with all services of that service group. For example, the team approves any changes to the service group, for example, services that are part of the service group. A team may be associated with a data center and is accordingly associated with all service groups within the data center. A team association specified at a data center level provides a default team for all the service groups within the data center and further provides a default team for all services within the service groups.

According to an embodiment, a team association specified at the functional level overrides the team association provided at the data center level. Similarly, a team association specified at the service level overrides the default that may have been provided by a team association specified at the service group level or a data center level. A team can decide how certain action is taken for the data center entity associated with the team. The team associations also determine the number of accounts on the cloud platform that are created for generating the final metadata representation of the data center for a cloud platform by the compiler and for provisioning and deploying the data center on a cloud platform. The data center generation module 210 creates one or more user accounts in the cloud platform and provides access to the team members to the user accounts. Accordingly, the team members are allowed to perform specific actions associated with the data center entity associated with the team, for example, making or approving structural changes to the data center entity or maintenance of the data center entity when it is deployed including debugging and testing issues that may be identified for the data center entity.

Conventional techniques associate the same team with the data center through out the design process thereby resulting in the organizational structure having an impact on the design of the data center or service group as stated by Conwoy's law. Conwoy's law states that organizations which design systems are constrained to produce designs which are copies of the communication structures of these organizations. Embodiments decouple the team definition from the constructions that define the data center entity, thereby reducing the impact of the teams on the design and architecture of the data center entity.

```
{
  "team_definition": [
    {
      "name": "team1",
      "description": "description of team",
      "admins": [
        "user1",
        "user2",
        "user3",
        "user4",
        ...
      ],
      "team_id": "id1",
      "owner": "owner_id",
      "email": "team1@xyz.com",
    }
  ],
  "communication channel": "channel1"
  "schema version": "1.0"
}
```

An environment definition 460 specifies a type of system environment represented by the data center, for example, development environment, staging environment, test environment, or production environment. A schema definition 470 specifies schema that specifies syntax of specific data center entity definitions. The schema definition 470 is used for validating various data center entity definitions. The data center generation module determines security policies for the data center in the cloud platform specific metadata representation 235 based on the environment. For example, a particular set of security policies may be applicable for an environment env1 and a different set of security policies may be applicable for environment env2. For example, the security policies provide much more restricted access in production environment as compared to development environment. The security policy may specify the length of time that a security token is allowed to exist for specific purposes. For example, long access tokens (e.g., week long access tokens) may be allowed in development environment but access tokens with much smaller life time (e.g., few hours) used in production environment. Access tokens may allow users or services with access to specific cloud platform resources.

A data center definition 420 specifies the attributes and components of a data center instance. A declarative specification may specify multiple data center instances. The data center definition 420 specifies attributes including a name, description, a type of environment, a set of service groups, teams, domain name servers for the data center, and so on. A data center definition may specify a schema definition and any metadata representation generated from the data center definition is validated against the specified schema definition. A data center includes a set of core services and capabilities that enable other services to function within the data center. An instance of a data center is deployed in a particular cloud platform and may be associated with a particular environment type, for example, development, testing, staging, production, and so on.

Following is a definition of a data center instance. The data center instance definition includes a list of service groups included in the data center instance and other attributes including an environment of the data center, a data center identifier, a name, a region representing a geographical region, one or more teams associated with the data center, and a schema version.

```
{
  "datacenter_instance": {
    "environment": "env1",
    "datacenter_instance_identifier": "id1",
    "name": "data center1",
    "region": "region1",
    "service_groups": [
      "service_group1",
      "service_group2",
      "service_group3",
      "service_group4",
      ...
    ],
    "schema_version": "1.0",
    "admin_team":"admins",
    ...
  }
}
```

Figure 5:
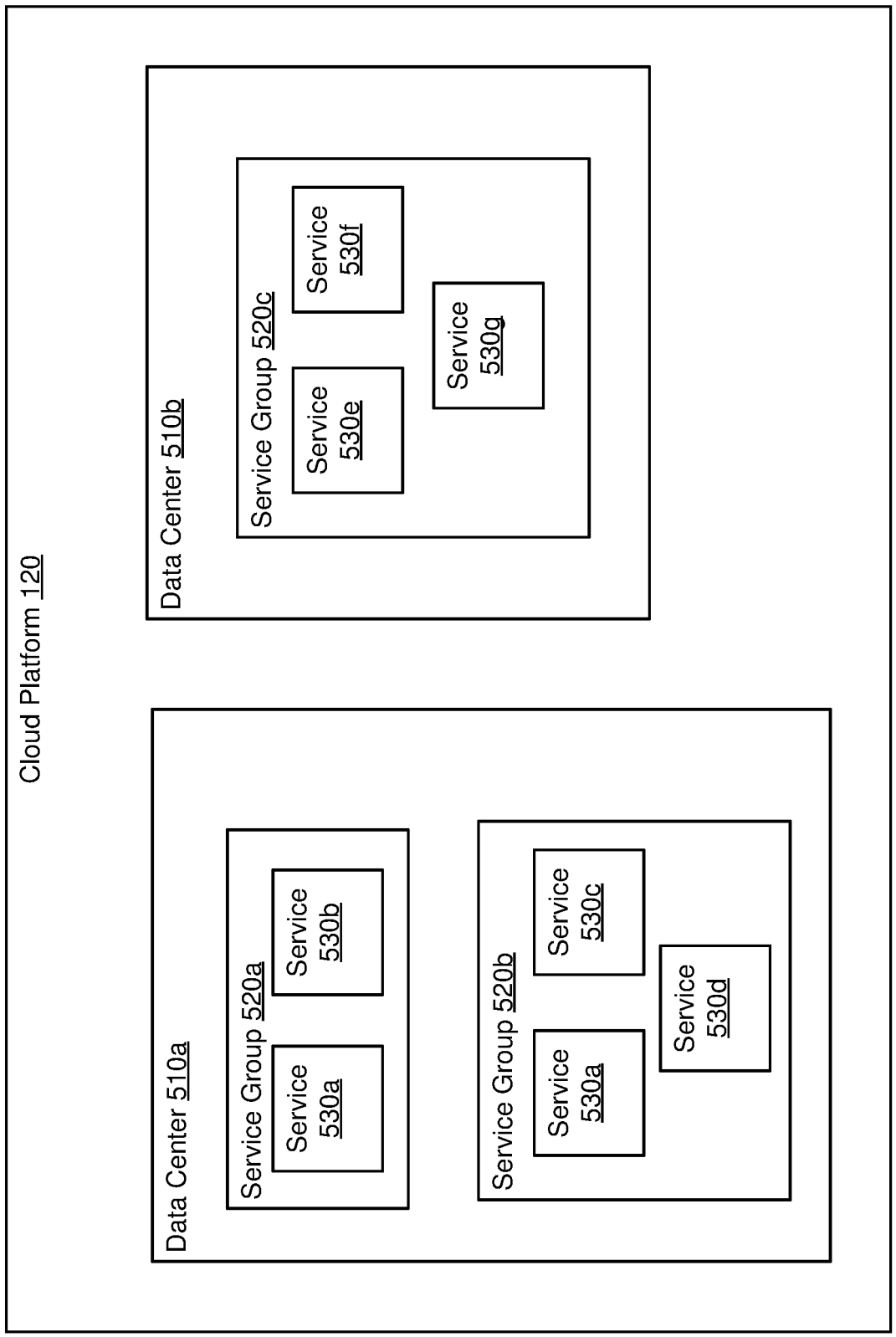
FIG. 5 illustrates example data centers created on a cloud platform based on a declarative specification according to one embodiment.
Figure 6:
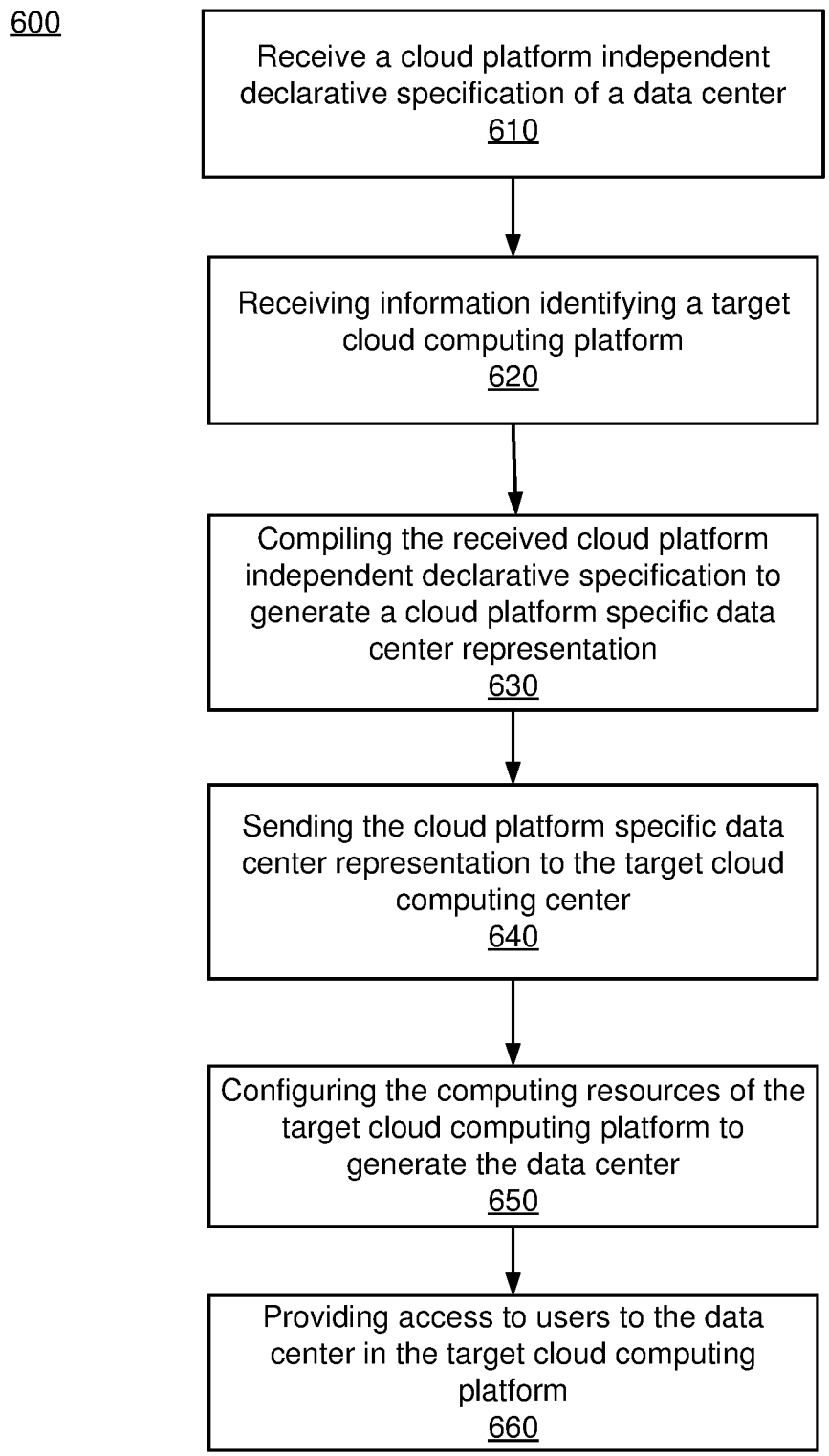
FIG. 6 is a flow chart illustrating the process for creating data centers on cloud platforms based on a declarative specification according to one embodiment.

FIG. 5 illustrates some example data centers created on a cloud platform based on a declarative specification according to one embodiment. The data centers 510 may be created based on a declarative specification processed by the data center generation module 210. As shown in FIG. 5, multiple data centers may be configured within a cloud platform 120. Each data center 510 may correspond to a tenant 115 of a multi-tenant system 110. A tenant 115 may create one or more data centers 510. Alternatively, a data center 510 may be created by any computing system. Each data center includes one or more service groups. For example, data center 510a includes service groups 520a and 520b and data center 510b includes service group 520c. A data center may include multiple instances of a particular type of service group. Each service group includes a set of services. For example, service group 520a includes services 530a and 530b, service group 520b includes services 530a, 530b, and 530c, and service group 520c includes services 530e, 530f, and 530g. A service group may include multiple instances of services of the same service type. There may be other data center entities included in a datacenter, for example, functional domains that include services or service groups.

Overall Process

Figure 7:
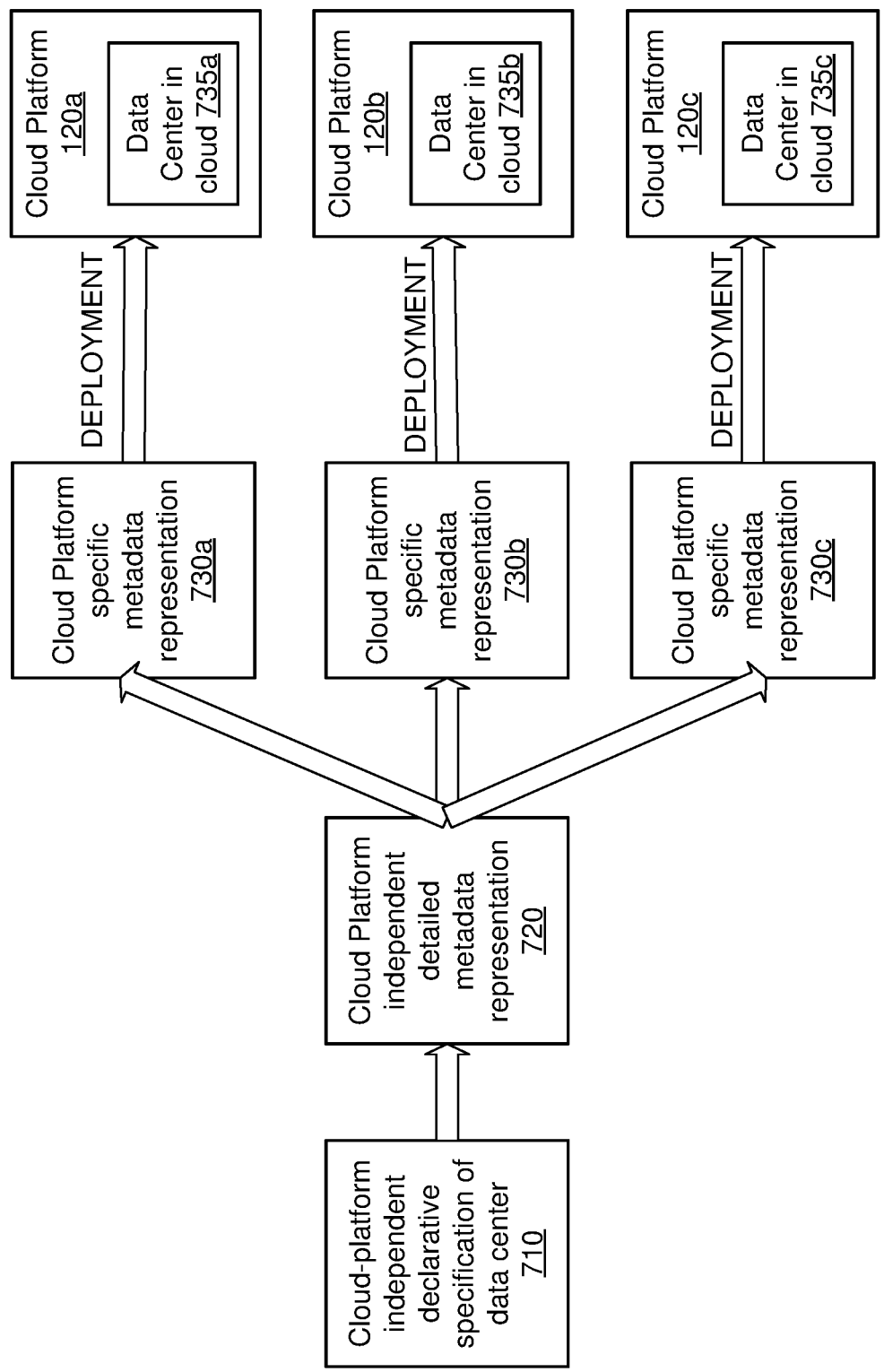
FIG. 7 is a block diagram illustrating generation of data centers on cloud platforms based on a declarative specification, according to one embodiment.

FIG. 7 is a flow chart illustrating the process for creating data centers on cloud platforms based on a declarative specification according to one embodiment. Other embodiments can perform the steps of FIG. 7 in different orders. Moreover, other embodiments can include different and/or additional steps than the ones described herein.

The data center generation module 210 receives 610 a cloud platform independent declarative specification of a data center. The cloud platform independent declarative specification may be for a tenant of the multi-tenant system or for any other computing system, for example, an online system. The cloud platform independent declarative specification is specified using the cloud platform infrastructure language. The cloud platform independent declarative specification of the data center is configured to generate the data center on any of a plurality of cloud platforms.

The data center generation module 210 receives 620 information identifying a target cloud platform for creating the data center based on the cloud platform independent declarative specification. The target cloud platform could be any of a plurality of cloud platforms, for example, AWS, AZURE, GCP, and so on. The data center generation module 210 further receives information to connect with the target cloud platform, for example, credentials for creating a connection with the target cloud platform. A cloud platform may also be referred to as a cloud computing platform.

The data center generation module 210 compiles 630 the cloud platform independent declarative specification to generate a cloud platform specific data center representation for creating the data center on the target cloud computing platform. For example, the cloud platform specific data center representation may refer to user accounts, network addresses, and so on that are specific to the target cloud computing platform.

The data center generation module 210 sends 640 the platform specific data center representation along with instructions for deploying the data center on the target cloud computing platform. The target cloud computing platform executes the instructions to configure 650 the computing resources of the target cloud computing platform to generate the data center according to the platform specific data center representation. The data center generation module 210 provides 660 users with access to the computing resources of the data center configured by the cloud computing platform. For example, if the data center was created for a tenant of the multi-tenant system, users associated with the tenant are provided with access to the data center.

FIG. 7 is a block diagram illustrating generation of data centers on cloud platforms based on a declarative specification, according to one embodiment. The data center generation module 210 receives as input a cloud-platform independent declarative specification 710 (represented as the declarative specification 225 in FIG. 2). The cloud-platform independent declarative specification 710 may be a version of the declarative specification that is being incrementally modified by users. The data center generation module 210 processes a particular version of the cloud-platform independent declarative specification 710. Since cloud-platform independent declarative specification 710 is not specified for any specific target cloud platform, the data center generation module 210 can configure a data center on any target cloud platform based on the cloud-platform independent declarative specification 710.

The data center generation module 210 processes the cloud-platform independent declarative specification 710 to generate a cloud-platform independent detailed metadata representation 720 for the data center. The cloud-platform independent detailed metadata representation 720 defines details of each instance of data center entity specified in the cloud-platform independent declarative specification 710. The data center generation module 210 creates unique identifiers for data center entity instances, for example, service instances.

In an embodiment, the cloud-platform independent detailed metadata representation 720 includes an array of instances of data center entity types, for example, an array of service group instances of a particular service group type. Each service group instance includes an array of service instances. A service instance may further include the details of a team of users that are allowed to perform certain actions associated with the service instance. The details of the team are used during provisioning and deployment by the data center generation module 210, for example, for creating a user account for the service instance and allowing members of the team to access the user account.

The cloud-platform independent detailed metadata representation 720 includes attributes of each instance of data center entity. Accordingly, the description of each instance of data center entity is expanded to include all details. As a result, the cloud-platform independent detailed metadata representation 720 of a data center may be significantly larger than the cloud-platform independent declarative specification 710. For example, the cloud-platform independent declarative specification 710 may be few thousand lines of specification, whereas the cloud-platform independent detailed data center representation 320 may be several hundred thousands of lines of generated code. As a result, the data center generation module 210 keeps the cloud-platform independent detailed metadata representation 720 as immutable, i.e., once the representation is finalized, no modifications are performed to the representation. For example, if any updates, deletes, or additions of data center entities need to be performed, they are performed on the cloud platform independent declarative specification 710.

The data center generation module 210 receives a target cloud platform on which the data center is expected to be provisioned and deployed and generates a cloud platform specific detailed metadata representation 730 of the data center. For example, the data center generation module 210 interacts with the target cloud platform to generate certain entities (or resources), for example, user accounts, virtual private clouds (VPCs), and networking resources such as subnets on the VPCs, various connections between entities in the cloud platform, and so on. The data center generation module 210 receives resource identifiers of resources that are created in the target cloud platform, for example, user account names, VPC IDs, and so on, and incorporates these in the cloud-platform independent detailed metadata representation 720 to obtain the cloud platform specific metadata representation 730 of the data center. In an embodiment, the data center generation module 210 creates one unique user account on the cloud platform for each team for a given combination of a service group and a service. The user account is used by the team for performing interactions with that particular service for that service group, for example, for debugging, for receiving alerts, and so on.

The data center generation module 210 deploys the cloud platform specific metadata representation 730 on the specific target cloud platform for which the representation was generated. The data center generation module 210 may perform various validations using the generated metadata representations, including policy validations, format validations, and so on.

The cloud platform independent declarative specification 710 may be referred to as a declared data center representation, cloud-platform independent detailed metadata representation 720 referred to as a derived metadata representation of the data center, and cloud platform specific metadata representation 730 referred to as a hydrated metadata representation of the data center.

Deploying a Data Center on a Cloud Platform

The target cloud platform processes the cloud-platform specific detailed metadata representation 730 to create (or configure) the data center. The data center generation module 210 generates instructions for deploying the cloud-platform specific detailed metadata representation 730 on a target cloud platform. The instructions may be represented as a pipeline comprising stages, where each stage performs certain operations related to deployment of the data center, for example, the pipelines may represent instructions of a continuous delivery platform such as SPINNAKER.

The target cloud platform may perform several steps to process the cloud-platform specific detailed metadata representation 730. For example, the cloud platform independent declarative specification may specify permitted interactions between services. These permitted interactions are specified in the cloud-platform specific detailed metadata representation 730 and implemented as network policies of the cloud platform. The cloud platform may further create security groups to implement network strategies to implement the data center according to the declarative specification.

The cloud platform independent declarative specification specifies dependencies between services, for example, start dependencies for each service listing all services that should be running when a particular service is started. The compilation module 230 generates the cloud platform specific detailed metadata representation of the data center that includes information describing these dependencies such that the instructions for deploying the service ensure that the cloud platform starts the services in an order specified by the dependencies such that for each service, the services required to be started before the service are running when the service is started. Accordingly, the dependencies between services represent a dependency graph and the cloud platform starts running the services in an order determined based on the dependency graph such that if service A depends on service B, the service B is started before service A is started.

The data center generation module 230 creates trust relationships between user accounts that allow services to access other services via secure communication channels. These trust relationships are generated using substrate specific instructions generated based on the declarative specification, for example, based on outbound access attributes specified for services. The data center generation module 230 sends instructions to the cloud platform to create network policies based on cloud platform specific mechanisms that control the interactions and access across service groups and services, for example, as specified by the constructs of the declarative specification such as outbound access, security groups, security policies and so on.

The data center generation module 230 generates instructions, for example, pipelines for deploying the services that specifies stages that determine the order in which the services are started in a deployment.

Figure 8:
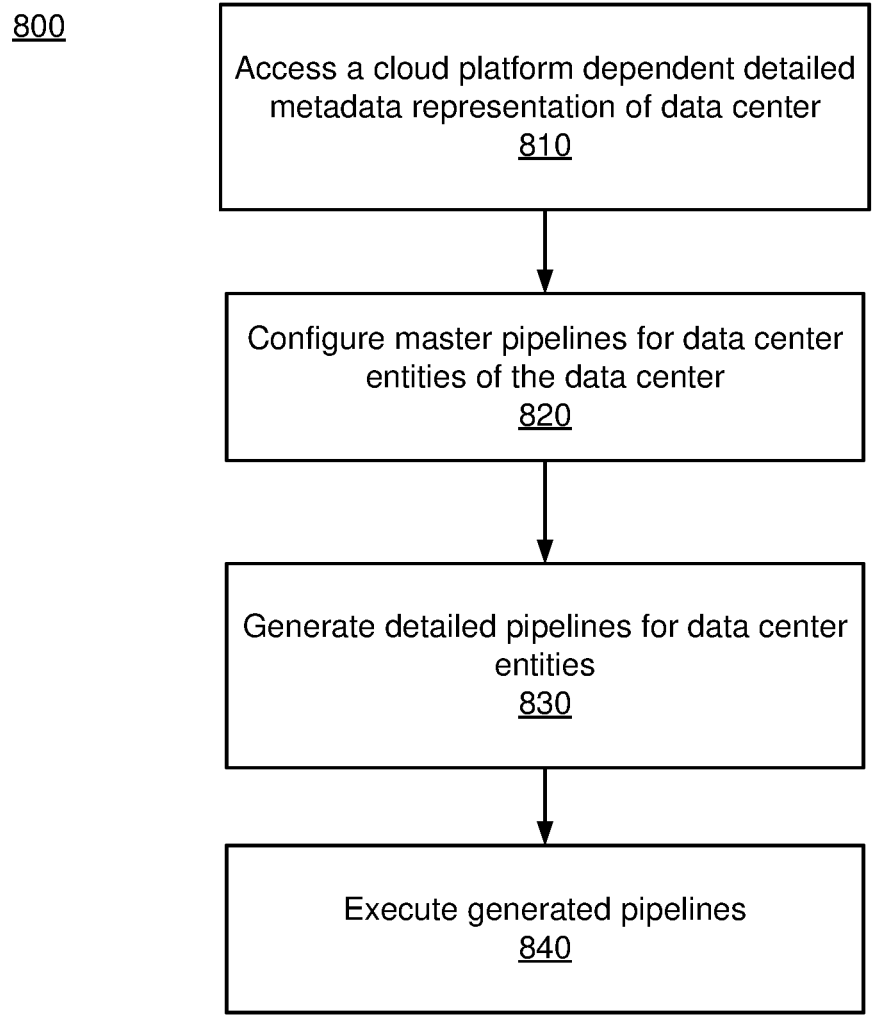
FIG. 8 is a flow chart illustrating the process for deploying data centers on a cloud platform according to one embodiment.

FIG. 8 is a flow chart illustrating the process for deploying data centers on a cloud platform according to one embodiment. The data center generation module 210 accesses 810 a cloud platform specific detailed metadata representation 730 of the data center. The cloud platform specific detailed metadata representation 730 is generated from a cloud platform independent declarative specification 710, for example, as shown in FIG. 7.

The data center generation module 210 configures 820 master pipelines for data center entities of the data center. A master pipeline comprises multiple pipelines, for example, a provisioning pipeline for provisioning resources of the target cloud platform and a deployment pipeline for deploying a data center entity using the provisioned resources. Each pipeline comprises a sequence of stages, each stage representing one or more actions that need to be performed by the target cloud platform towards provisioning and deploying of the data center. The data center generation module 210 generates 830 detailed pipelines for generating specific services as specified by the cloud platform specific detailed metadata representation 730.

In an embodiment, the detailed pipelines are generated from pipeline templates that include variables. A pipeline template is converted into a pipeline by providing specific values of the variables in the pipeline. The process of generating a pipeline from a template is referred to as hydration of the pipeline template. A pipeline template contains templating expressions used as placeholders for actual values used in the deployment. For example, a templating expression may be replaced by target specific parameter values or expressions. Multiple pipeline instances may be generated by hydrating the pipeline template for different targets. The template variables represent parameters that may be replaced with specific values for a given target to generate a pipeline instance specific to that target. For example, a template variable "account_id" may be replaced with an actual value of account_id, for example, "12345" during hydration.

The template hydration module may access a data source, for example, a configuration file or a database to identify actual values of parameters used in templating expressions. For example, a template variable may represent a set of computing systems of a cluster. The data center generation module 230 executes 840 the generated pipelines on the target cloud platform. For example, the provisioning pipeline may be executed first to provision resources on the cloud platform and then the deployment pipelines executed to deploy applications on the provisioned resources for creating the data center on the target computing platform.

The process for generating pipelines according to one embodiment is as follows. The data center generation module 210 generates pipelines in a hierarchical fashion based on the hierarchy of the data center entities of the data center. For example, the data center comprises data center entities of different types including data centers, service groups, services, and so on. A data center entity may include one or more child data center entities. Fore example, a data center includes one or more service groups as child data center entities. A service group includes one or more services as child data center entities. Accordingly, the data center generation module 210 starts at a data center entity at a level of the hierarchy and generates pipelines of data center entities below that level. For example, the data center generation module 210 starts at the data center and generates pipelines for service groups within the data center. For each service group, the data center generation module 210 generates pipelines for services within the service group.

The generation of pipelines for an input data center entity that has a set of child data center entities is as follows. The data center generation module 210 identifies a set of child data center entities for the input data center entity. The data center generation module 210 generates a dependency graph for the set of child data center entities. For example, if the child data center entities represent services, the data center generation module 210 identifies dependency relations specified in the cloud platform specific detailed metadata representation 730 which are obtained from the cloud platform independent declarative specification 710. The data center generation module 210 analyzes the dependency graph, for example, to check for cycles in the dependency graph. If the data center generation module 210 identifies cycles in the dependency graph, the data center generation module 210 reports an error. If there are no cycles in the dependency graph, the data center generation module 210 further processes the dependency graph by performing topological sort of the dependency graph. The data center generation module 210 determines an order of the child data center entities based on the topological sort. The data center generation module 210 orders the child data center entities based on the sort order of the dependency graph. The data center generation module 210 creates a stage in the pipeline for each child data center entity arranged in the order determined for the child data center entities. The stage may be for provisioning resources for the child data center entity while generating a provisioning pipeline or the stage may be for deploying the child data center entity if a deployment pipeline is being generated.

The process for executing pipelines according to one embodiment is as follows. The data center generation module 210 receives a request to deploy a data center in the target cloud platform. The data center generation module 210 executes the aggregate pipelines for each service group of the data center. The aggregate pipeline comprises pipelines for services within the service group. For each service within each service group, the pipeline is executed by executing all the stages of the pipeline. The execution of the provisioning pipelines results in provisioning of the resource for a service and the deployment pipeline causes deployment of the service in the target cloud platform.

Customization of Data Centers Deployed on a Cloud Platform

Embodiments allow users to provide customization specification in conjunction with declarative specification to customize the data center being created based on the declarative specification. This allows code reuse since the same declarative specification can be used for various data centers being generated, each having differences compared to others. Furthermore, the ability to customize the declarative specification reduces the amount of specification that is specified by the users. For example, if different declarative specifications are used for creating multiple data centers, the amount of specification provided is significantly more than the embodiments that require a single declarative specification combined with multiple customized specification. This is so because the customization specification only specifies the portions of the declarative specification that are different in the customized data center and is therefore significantly smaller than the declarative specification.

Customization Specification

The system uses a particular declarative specification to generate a data center configuration. The declarative specification acts as a template that can be used to create multiple instances of data centers that have matching configuration as specified by the declarative specification. However, the same data center may not satisfy the requirements for different users. For example, different tenants of a multi-tenant system may have different requirements for data centers. Similarly, different teams within the same organization may have different requirements for data centers. The requirements of different tenants or teams may differ due to differences in capacity needs, different in security considerations, differences due to geographical locations (e.g., different geographical locations requiring different security measures), and so on. Embodiments allow a declarative specification to be customized while allowing the ease of specification and maintenance provided by the cloud platform infrastructure language.

The system according to various embodiments implements polymorphism of state of the data centers. This is distinct from polymorphism of functions that is supported by object-oriented systems and languages. An instance starts by instantiation with a base declarative specification of a data center with customization added through the customized specification which also uses declarative mechanism. This allows users to customize configurations for the various use cases. The system according to various embodiments offers complex transformations of data center entities such as functional domains, services, and so on. Examples of transformations supported include, replace operation, union operation, intersect operation, exclusion operation, and expansion through interpolation operations. A customization specification may transform various attributes of the data center entities using these operations if specific filtering criteria are satisfied. This transformation may also be referred to as an operation.

The system may receive customized specifications to generate different data centers to implement different policies such as network policies, security policies, identity management policies, and so on. The system may receive customized specifications to generate different data centers having different configurations for different substrates (i.e., different cloud platforms).

System Architecture of Data Center Customization Module

Figure 9:
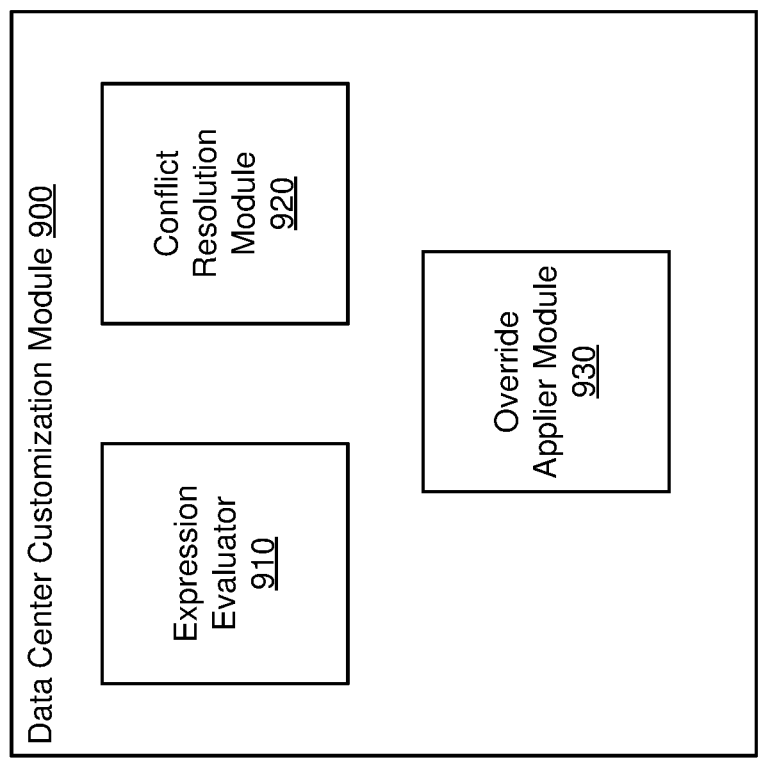
FIG. 9 is a block diagram illustrating the system architecture of a data center customization module according to an embodiment.

FIG. 9 is a block diagram illustrating the system architecture of a data center customization module 900 according to an embodiment. The data center customization module 900 includes an expression evaluator 910, a conflict resolution module 920, and an override applier module 930. Other embodiments may have more or fewer modules and functionality indicated as being performed by a module may be performed by other modules than those indicated herein. The data center customization module may be part of the data center generation module 210.

The expression evaluator 910 processes filter expressions that specify which data center entity needs to be customized. The filter expression is received from the customization specification. The filter expression may be based on attributes associated with data center entities, for example, attributes of the data center entity itself, attributes of other data center entities that contain the data center entity, either directly or indirectly via other data center entities, or other system attributes, for example, attributes describing the system in which the data center entities are being configured, attribute describing the substrate (i.e., the cloud platform), and so on. The filter expressions may be associated with names or any other expression identifier. This allows filter expressions to be combined with other filter expressions, for example, using Boolean operators or arithmetic operators.

The override applier module 930 combines the declarative specification of a data center with a customization specification to generate a metadata representation for a customized data center. The override applier module 930 determines whether a data center entity satisfies a filter condition specified in the customization specification. If the data center entity fails to satisfy the filter condition, the override applier module 930 uses the attribute values according to the declarative specification. If the data center entity satisfies the filter condition, the override applier module 930 uses the attribute values according to the customization specification.

The conflict resolution module 920 handles conflicts if an attribute satisfies multiple override definitions from customization specification(s). Accordingly, there are multiple candidate values for the attribute. The conflict resolution module 920 uses conflict resolution techniques such as those described herein to select a particular value from a plurality of candidate values for each attribute.

Figure 10:
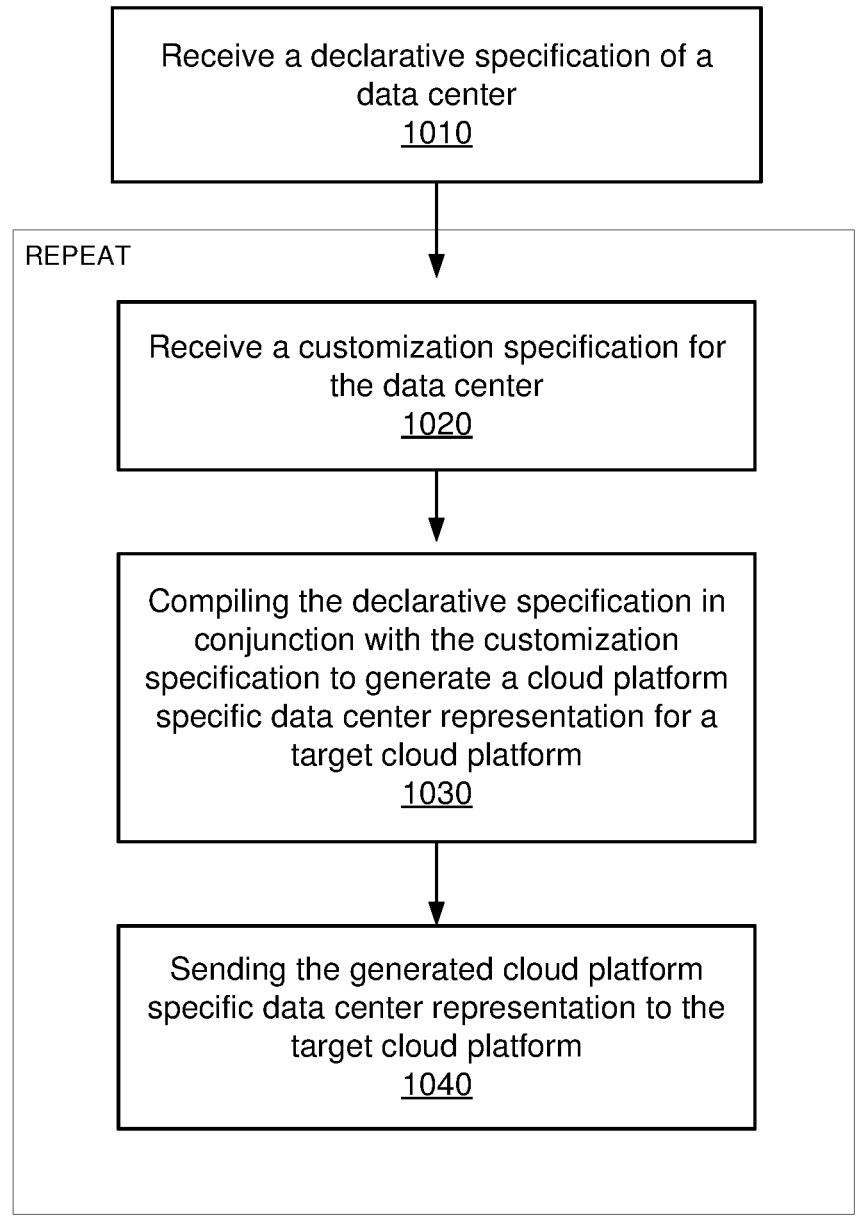
FIG. 10 is a flow chart illustrating the process for customizing a data center deployed on a cloud platform according to one embodiment.

FIG. 10 is a flow chart illustrating the process for customizing a data center deployed on a cloud platform according to one embodiment. The steps may be performed by other modules than those indicated herein.

The data center customization module 900 receives 1010 a declarative specification of a data center. The declarative specification is cloud platform independent and is configured to generate the data center on any of a plurality of cloud platforms. The declarative specification specifies at least a set of data center entities that may be of one or more data center entity types and have at least a particular attribute, for example, attribute A. The data center customization module 900 may repeat the steps 1020, 1030, and 1040 multiple times, for example, for customizing the declarative specification multiple times.

The data center customization module 900 receives a customization specification for the data center that defines: (1) a filtering criterion based on characteristics of data center entities of the set, and (2) a modified value of the particular attribute. The data center customization module 900 compiles the declarative specification in combination with the customization specification to generate a cloud platform specific data center representation for creating the data center on a target cloud platform. The data center customization module 900 sends the cloud platform specific data center representation to the target cloud platform. The target cloud platform configures the data center using the cloud platform specific data center representation such that: (1) the datacenter entities that satisfy the filtering criterion have the particular attribute according to the customization specification, and (2) the datacenter entities that fail to satisfy the filtering criterion have the particular attribute according to the declarative specification. The customization specification may also be referred to as the override specification.

Figure 11:
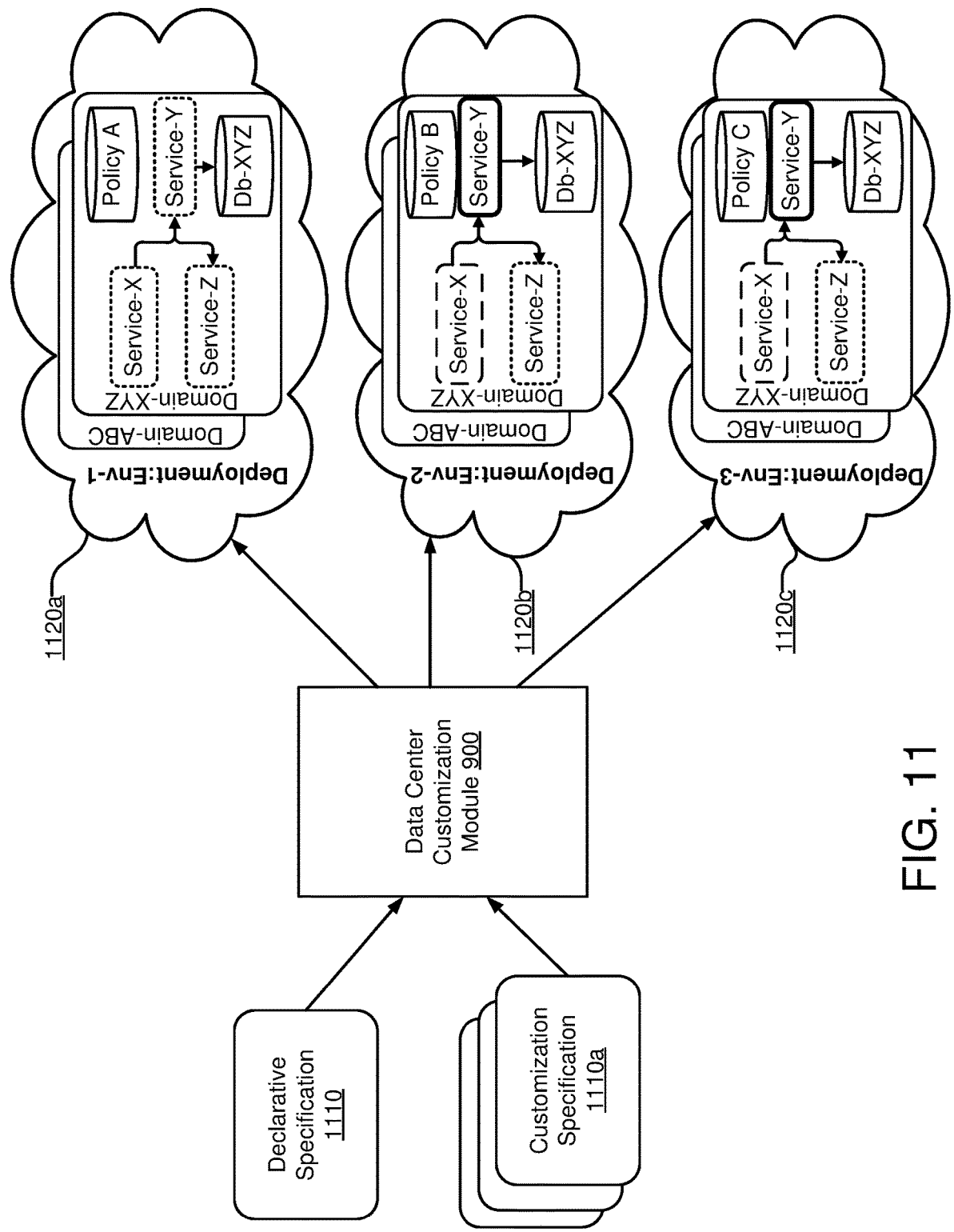
FIG. 11 illustrates customization of a declarative specification to generate modified data centers, according to an embodiment.

FIG. 11 illustrates customization of a declarative specification to generate modified data centers, according to an embodiment. The declarative specification 1110 specifies multiple services, for example, service-X, service-Y, and service-Z. The declarative specification implements a specific policy (e.g., policy A) that is most commonly applicable to various environments. However, certain environments may implement specific policies. For example, certain environments may be highly sensitive to security and need more restrictive security policies. The customization specification 1115, for example, 1115a, 1115b, 1115c modifies the service specifications according to various policies. The customization may change specific attributes of the services to implement different policies. Each policy is implemented for a different environment. For example, the customization specification 1115 specifies a filtering criterion that compares the environment to specific values. If the environment has a specific value, the service attributes may be modified to implement specific policies. For example, policy A may be implemented for environment 1120a, policy B may be implemented for environment 1120b, and policy C may be implemented for environment 1120c. Examples of various policies that may be customized in data centers include identity management policies, network access control policies, outbound proxy policies, and so on.

Furthermore, the customized specification allows different parameters or configurations to be used for different cloud platforms (i.e., substrates.) Although the declarative specification is cloud platform independent, different configurations and parameters may be preferable for different cloud platforms. For example, a parameter value V1 may be preferred for a parameter for cloud platform C1 and a value V2 may be preferred for the parameter for cloud platform C2. The customized specification is used to set different parameter values for different cloud platform. Accordingly, the customization specification specifies a filtering criterion that checks the substrate type and sets an attribute or a data center entity based on the substrate type.

As another example, two stack instances of the same software can have different configurations (compute instance types, software feature flags, etc.). The filtering criteria of the customization specification checks for various attribute values to determine the stack instance, for example, the filtering criteria may check for specific software feature flags. If the filtering criteria is satisfied, the customization specification sets the values of specific attributes of data center entities based on the identified stack instance type.

Figure 12:
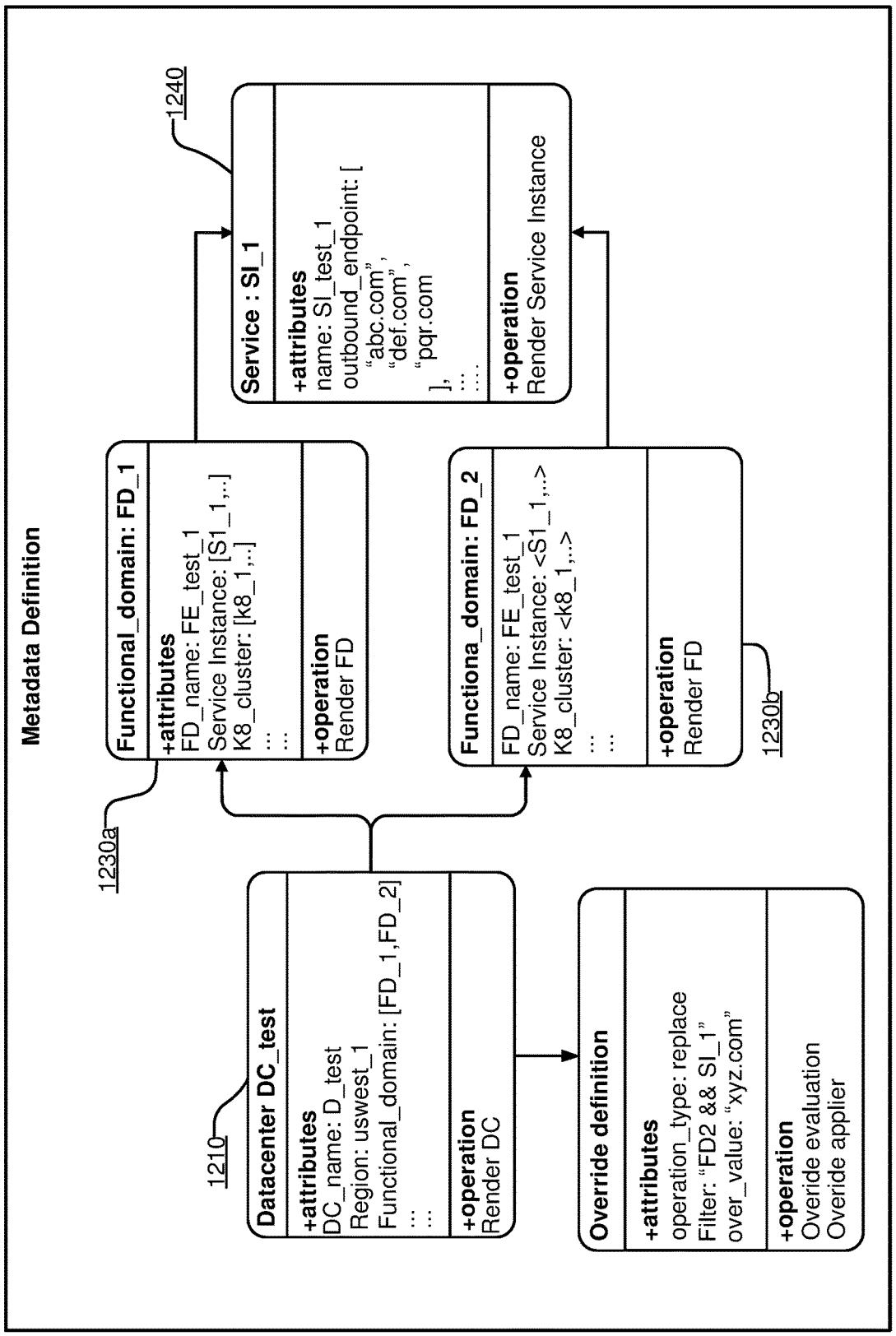
FIG. 12 illustrates an example customization specification in conjunction with a declarative specification, according to an embodiment.

FIG. 12 illustrates an example customization specification in conjunction with a declarative specification, according to an embodiment. As shown in FIG. 12, the declarative specification includes a data center definition 1210 that specifies a plurality of data center entities, for example, functional domains 1230. The functional domains 1230 include services 1240. The data center entity 1210 includes functional domains FD_1 and FD_2. The functional domain includes services of a service type, for example, service type SI_1 that includes an attribute, for example, attribute outbound_endpoint.

FIG. 12 further shows a customization specification 1220 comprises an override definition. The override definition specifies a filter expression and an override value for a particular attribute. The filter expression represents a filtering criterion that may be represented as an expression. For example, the filter expression of the override definition specifies that the override value of the attribute is applied when the functional domain name is FD_2 and the service name is SI 1. Accordingly, the value of attribute outbound endpoint for all instances of service SI_1 in functional domain FD_2 is modified according to the override value specified by the override definition 1220. The value of attribute outbound endpoint for all remaining instances of service SI 1, for example, instances of service SI_1 in functional domain FD_1 is determined according to the value specified by the data center definition 1210 of the declarative specification. Following is an example of a portion of datacenter representation generated as a result of customization as shown in FIG. 12. The service instance SI_1 of the functional domain FD_2 has the outbound_endpoint attribute value set to ["xyz.com" ] according to the override specification whereas the service instance SI_1 of the functional domain FD_1 has the outbound_endpoint attribute value set to ["abc.com", "def.com", "pqr.com" ].

```
"falcon_instance": {
    "environment": "aws-dev2",
    "falcon_instance_id": "falcon_instance_id1",
    "functional_domains": [
        {
```

-continued

```
    "funtional_domain_id": "functional_domain_id1",
    "name": "FD_1,
    service_instance : [
      {
        "name": "SI_1,
        outbound_endpoint: [
          "abc.com",
          "def com"
          "pqr.com"
        ],
      },
      ...
      ...
    ]
  },
  {
    "functional_domain_id": "functional_domain_id2",
    "name": "FD_2",
    service_instance : [
      {
        name: "SI_1",
        outbound_endpoint: [
          "xyz.com", // overridden value
        ],
      },
      ...
      ...
    ]
  },
  ],
  ...
  ...
}
```

The filter expression of the override specification specifies the scope of the transformation operations applied to the data center entity being customized. The filter expression may specify that the transformation must be applied to all data center entities of a particular type, for example, all services in all functional domains or all service groups. The filter expression may specify that the transformation must be applied to a particular instance of a data center entity of that particular type, for example, a specific service instance in a specific functional domain or a specific service group.

In an embodiment, the filter expression is a tuple comprising a set of attributes. For example, the filter expression is tuple (name, entity, kind, keys). The name attribute specifies a unique name that identifies the filter. The entity type attribute specifies the type of data center entity (e.g., functional domain, service group, service, and so on). The kind attribute represents whether the entity represents a type of data center entity or an instance of data center entity. If the kind attribute represents a type of data center entity, the transformation applies to all instances of the data center entity having type specified by the entity attribute. If the kind attribute represents an instance of data center entity, the transformation applies to the instance of the data center entity identified by the entity attribute.

The filter expression may select specific data center entities by specifying attributes associated with the data center entity. For example, the filter expression may select all data center entities of a specific data center entity type. The filter expression may select all data center entities of a specific data center entity type that have specific value or values of certain attributes. For example, the filter expression may specify that the override operation applies to all datacenter entities of type T1 that have attribute A1 having values within a set of values {V1, V2, V3, ... }. The filter expression may be based on attributes of other data center entities. For example, the data center entities may form a containment hierarchy where a parent data center entity includes children data center entities. The filter expression specifies an attribute of another data center entity that contains the data center entity, either directly (e.g., as a child entity) or indirectly via other data center entities (e.g., as a grandchild or great grandchild entity). For example, if a functional domain includes a set of services, the filter expression may specify an attribute value of the functional domain. Accordingly, the override operation applies to all service instances of a service type that are within functional domains that have an attribute value specified by the filter expression.

A filter expression may be represented as a logical combination of other filter expressions, for example, using boolean operators such as AND, OR, NOT, XOR, and so on. The subexpressions may be identified using filter names or by inlining the subexpression within the filter expression. Accordingly, a data center entity satisfies the filtering criterion specified by the filter expression if the logical expression specified by the filter expression evaluates to true for the data center entity. For example, the filter expression may specify a set of values S1 for an attribute A1 of a parent data center entity D1 and a set of values S2 for an attribute A2 of the data center entity D2 itself. Accordingly, an instance of data center entity D2 satisfies the filtering criterion if the attribute A2 of the instance of the data center entity has a value within set S2 and the instance of a parent data center entity D1 has the attribute A1 that has value within the set S1.

The customization specification further specifies the modification to the attribute of the data center entities that satisfy the filtering criterion. The modification to the attribute may be specified using an operation that describes the transformation. The operation specifies (1) an operator, (2) a value for the attribute, and (3) a key for identifying the attribute. The value specified by the operation is used for transforming the attribute value. Accordingly, the attribute identified by the key for data center entities that satisfy the filter expression are modified according to the operator using the value specified by the operation. For example, the operation may specify the operator as "replace" the value {V1, V2}, and key "attr1". Accordingly, the attribute "attr1" of the matching data center entities are replaced with the new set of values {V1, V2}. If the operation specifies the operator as "OR" the value {V1, V2}, and key "attr1", the attribute "attr1" of the matching data center entities are replaced with the new set of values determined by performing an OR operation on the current value and the set {V1, V2}. The following table gives examples of various types of operators that may be specified by the transform operation.

| Operation | Description | Base value | Override value | Value in derived BOM |
|---|---|---|---|---|
| union | Replaces with values that are present in either declarative specification or customization specification. | {a,b} | {c,d} | {a,b,c,d} |
| replace | Replace with value provided in transformation operation of the customization specification. | {a,b,c,d} | {a,b,x,y} | {a,b,x,y} |
| intersect | Replaces with values that are present in both declarative specification and transformation operation of the customization specification. | {a,b,c,d} | {a,b,x,y} | {a,b} |

-continued

| Operation | Description | Base value | Override value | Value in derived BOM |
|---|---|---|---|---|
| exclude | Excludes the values present in the transformation operation from the values specified by the declarative specification. | {a,b,c,d} | | Values removed from the attribute. |

As shown in the above table, the transformation operation may specify a union operator to determine a value of the attribute of a data center entity as a union of the original value of the attribute of the data center entity with the value specified by the transformation operation of the override specification. The transformation operation may specify a replace operator to determine a value of the attribute of a data center entity by replacing the original value of the attribute of the data center entity with the value specified by the transformation operation of the override specification. The transformation operation may specify an intersect operator to determine a value of the attribute of a data center entity as an intersection of the original value of the attribute of the data center entity with the value specified by the transformation operation of the override specification. The transformation operation may specify an exclude operator to determine a value of the attribute of a data center entity by excluding the values specified by the transformation operation of the override specification from the original value of the attribute of the data center entity.

The above examples are provided for attributes that have values represented by a set or list of values. If an attribute has a numeric value, the transformation operation may specify a mathematical operator, for example, addition, subtraction, multiplication, division, or a combination of mathematical operators. Similarly, if the attribute has a string value, the transformation operation may specify a string operator such as concatenation. Note that the language syntax described herein is exemplary and any other syntax can be used for implementing the techniques disclosed herein.

Figure 13:
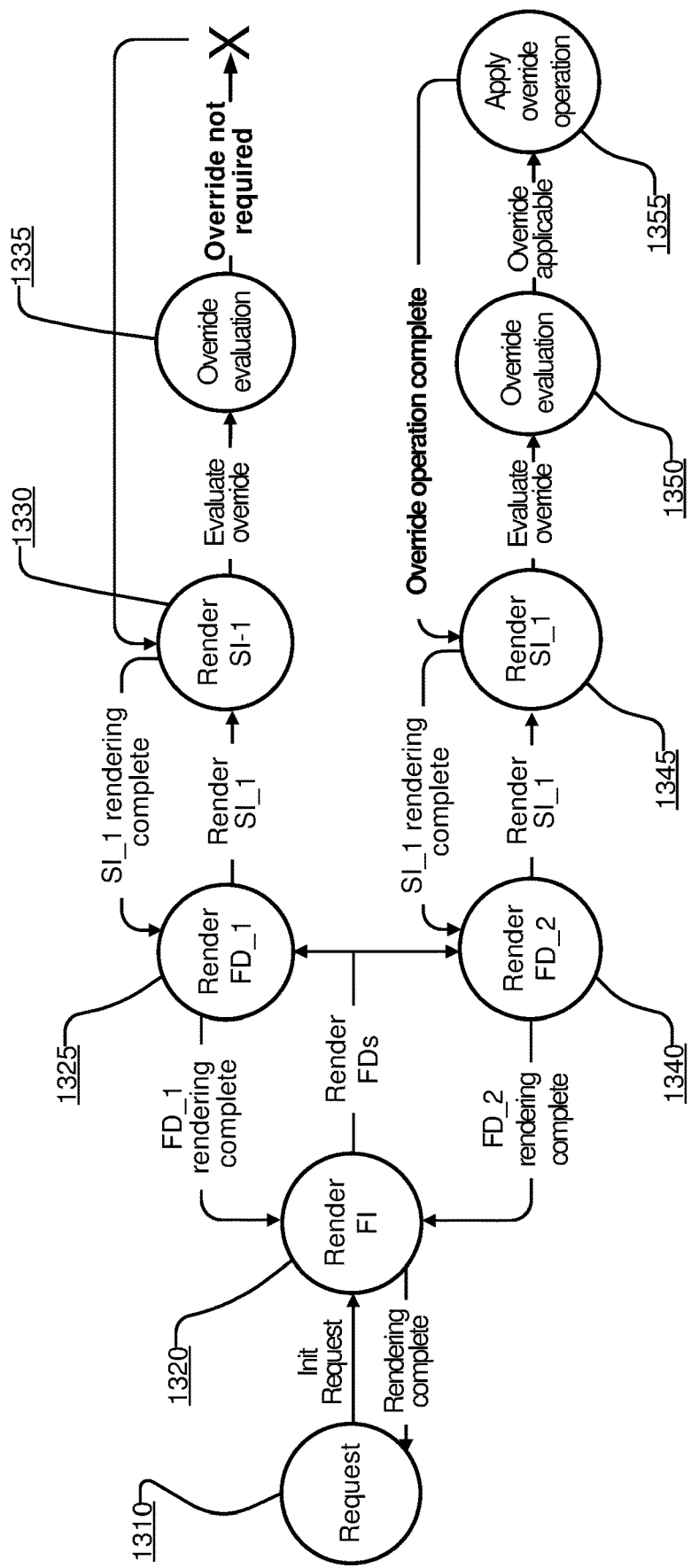
FIG. 13 illustrates state transition diagram illustrating the process of generating cloud platform specific representation based on a declarative specification that can be customized, according to an embodiment.

FIG. 13 illustrates state transition diagram illustrating the process of generating cloud platform specific representation based on a declarative specification that be customized, according to an embodiment. The system receives 1310 a request to generate a data center based on a declarative specification along with a customization specification, as shown in FIG. 12. The system processes the hierarchy of the data center entities specified by the declarative specification in a top down manner starting from the top level data center entity and recursively processing the data center entities contained within the hierarchy of the top level data center entity. This ensures that higher level data center entities are processed before the data center entities of the lower level in the hierarchy. Accordingly, the step 1320 indicates processing of a higher-level data center entity, for example, the top data center entity FI. The top data center entity includes two functional domain entities FD_1 and FD_2. The system processes 1325, 1340 each of the functional domain entities FD_1 and FD_2. Each of the functional domains FD 1 and FD 2 includes a service instance of service SI_1.

While processing 1330 the service instance SI_1 of the functional domain FD_1, the system performs the override evaluation 1335. The system determines that the service instance SI_1 of the functional domain FD_1 does not satisfy the filtering criterion since the filtering criterion specifies the name of the functional domain as FD_2 that fails to match the name of the functional domain FD_1. Accordingly, the system determines that override is not required for service instance SI_1 of the functional domain FD_1 and uses the value of the attribute according to the default declarative specification instead of the override specification.

While processing 1345 the service instance SI_1 of the functional domain FD_2, the system performs the override evaluation 1350. The system determines that the service instance SI_1 of the functional domain FD_2 satisfies the filtering criterion since the filtering criterion specifies the name of the functional domain as FD_2 that matches the name of the functional domain FD_2. Accordingly, the system determines that override is applicable for service instance SI_1 of the functional domain FD_3 and applies 1355 the override operation by using the value of the attribute according to the override specification instead of the default declarative specification.

Following is an example of a transformation operation.

```
"operation": [
  {
    "operator": "replace",
    "attribute": [
      "$outbound/allowed endpoints",
    ],
    "value":
      "xyz.com:443"
    },
  },
]
```

As shown in the above example, the operator is replace, the attribute is identified using the key "$outbound/allowed_endpoints" and the value is the set {"xyz.com:443" }. Accordingly, the filters allow users to increase or decrease the scope of transformation operation of the override specification, thereby supporting fine grained customization of declarative specification.

Following is an example of an override specification.

```
"overrides": [
  {
    "filters": [
      {
        "name": "fd_filter",
        "entity": "functional_domain", // entity type
        "kind": "name", // entity kind (name or type)
        "keys": [
          "core_fd"
        ]
      },
      {
        "name": "svc_filter",
        "entity": "service",
        "kind": "type",
        "keys": [
          "svc1_processing"
        ],
      }
    ],
    "expression": "fd_filter && svc_filter", // logical expression
    "operations": [
      {
        "type": "intersect", // operation type
        "key": "key1"
        "values": [
          ".xyz.com:222",
          ".pqr.com:333",
          ".abc.com:444"
        ]
      }
```

```
        ]
      }
    ],
    "schema_version": "1.0"
}
```

The above example includes a filter expression "fd_filter && svc_filter" that is an AND of two filters fd_filter and svc_filter. The filter fd_filter specifies an entity attribute as "functional_domain", the kind as "name" and keys ["core_fd"]. Accordingly, this filter is matched by datacenter entities that are functional domains and have a name that matches "core_fd". The filter svc_filter specifies an entity attribute as "service", the kind as "type" and keys ["svc1_processing"]. Accordingly, this filter is matched by datacenter entities that are services and have a service type that matches "svc1_processing". If the filter expression evaluates to true for a data center entity, i.e., for services that have type "svc1_processing" and are within a functional domain that has name "core_fd", the system performs the operation specified by the override specification. Accordingly, the system performs an intersect operation of the key "key1" with values specified in the list [".xyz.com:222", ".pqr.com:333", ".abc.com:444"].

Figure 14:
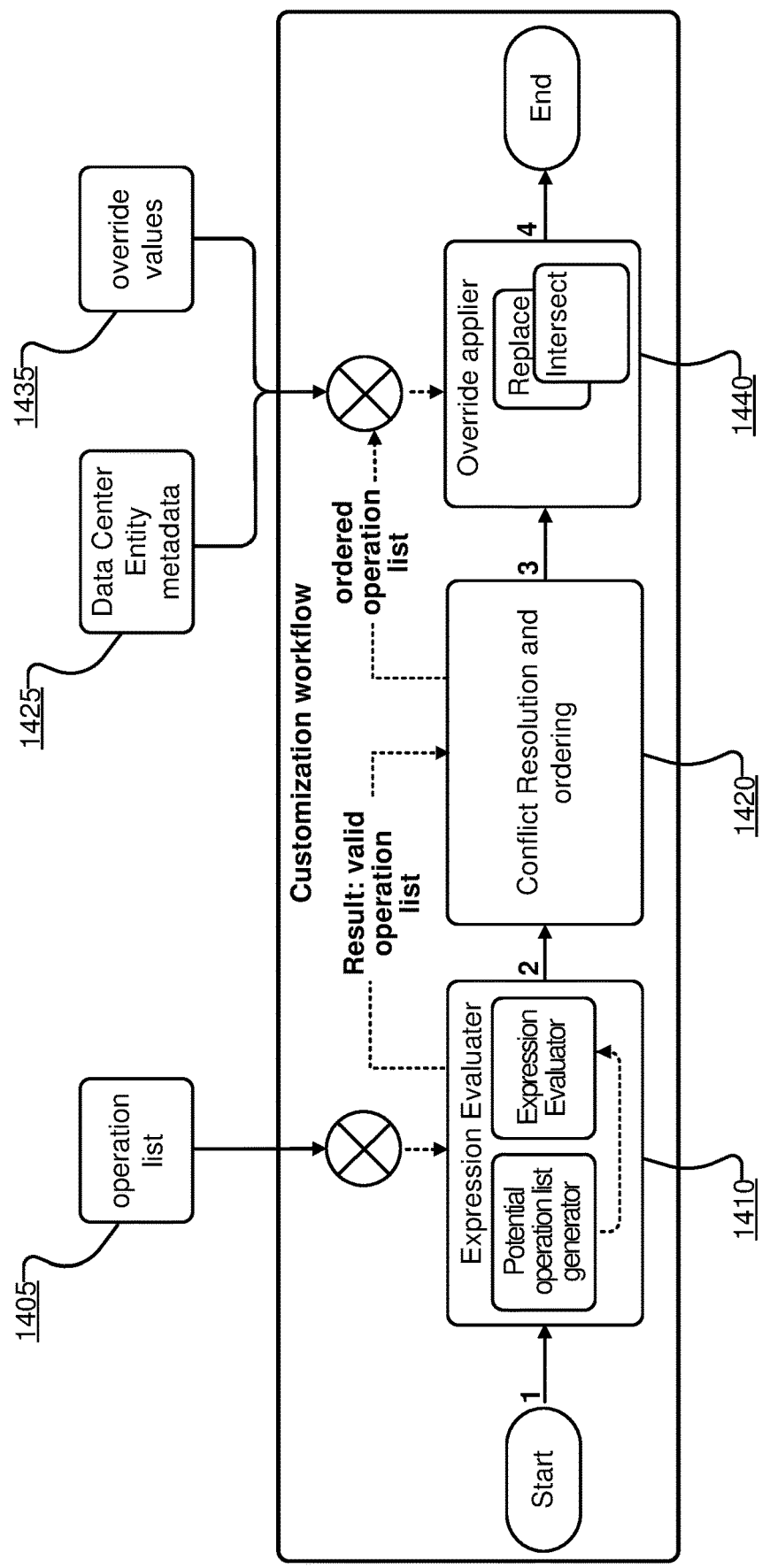
FIG. 14 illustrates the process of generating a customized datacenter, according to an embodiment.

FIG. 14 illustrates the process of generating a customized datacenter, according to an embodiment. The system receives the declarative specification and the customization specification and processes it. The system determines the data center entities according to the declarative specification and processes them in a top down fashion.

The system processes a data center entity as follows. The system evaluates 1410 various filter expressions to generate an operation list based on all the operations that are applicable to the data center entity. There may be multiple operations that may apply to the same attribute based on different customization specifications, for example, it the data center entity satisfies the filter expression of multiple override definitions 1220. The expression evaluation 1410 is performed several times since there can be several data center entities and each data center entity is evaluated for each override definition. In an embodiment, the system uses a bloom-filter to perform fast lookup for potential operation list for a data center entity. This potential operation list is further processed for a hit/miss evaluation.

If multiple operations are applicable to the same attribute of a data center entity, the system performs conflict resolution 1420 to order the operators and select a particular operator that is applied. The conflict resolution module performs conflict resolution across all the operations applicable to an attribute of a data center entity. The conflict resolution module may use a conflict resolution technique, for example, (1) order based conflict resolution that orders the operators in a predetermined order that may be ascending or descending and selecting an operator based on the order); (2) priority based conflict resolution my assigning priorities to different types of operations; (3) Aggregation of operations by combining multiple operations to determine a final result.

An operation applier receives the transformation operations and the data to be used and applies the operation to an attribute of a data center entity. The system supports a set of operations, for example, union, intersection and other set operations. According to an embodiment, users can define custom operators using code. The derivation pipeline uses the user defined custom operations as helper functions to perform the operations to satisfy the end users intent. Following is an example of a user defined operation.

```
"operation": [
  {
    "type": "replace",
    "key": [
      "key2",
    ],
    "transformation_operation": "user_defined_function_F(arg1, arg2) {# definition for custom transformation execute_custom_instructions
      return
    }
  }
]
```

The transformation operation (transformation_operation) in the above example includes custom instructions that are executed for the matching keys of the data center entity.

Embodiments disclosed allow users to customize declarative specification for defining data centers configured on cloud platforms. Conventional techniques may address such differences in cloud platform configurations using imperative specification that provides detailed instructions on how to implement the configuration differences. Such techniques are difficult for an end user to understand since end users may not have understanding of how the systems work. Furthermore, these techniques are difficult for developers to develop and maintain since they involve large amount of code and tedious details. The declarative specification used by various embodiments makes it easy to specify the configurations and easy to maintain. Furthermore, the amount of code that is specified for configuring the data centers is significantly smaller than corresponding imperative techniques. This improves the storage efficiency of the specification as well as maintainability of the specification.

Computer Architecture

Figure 15:
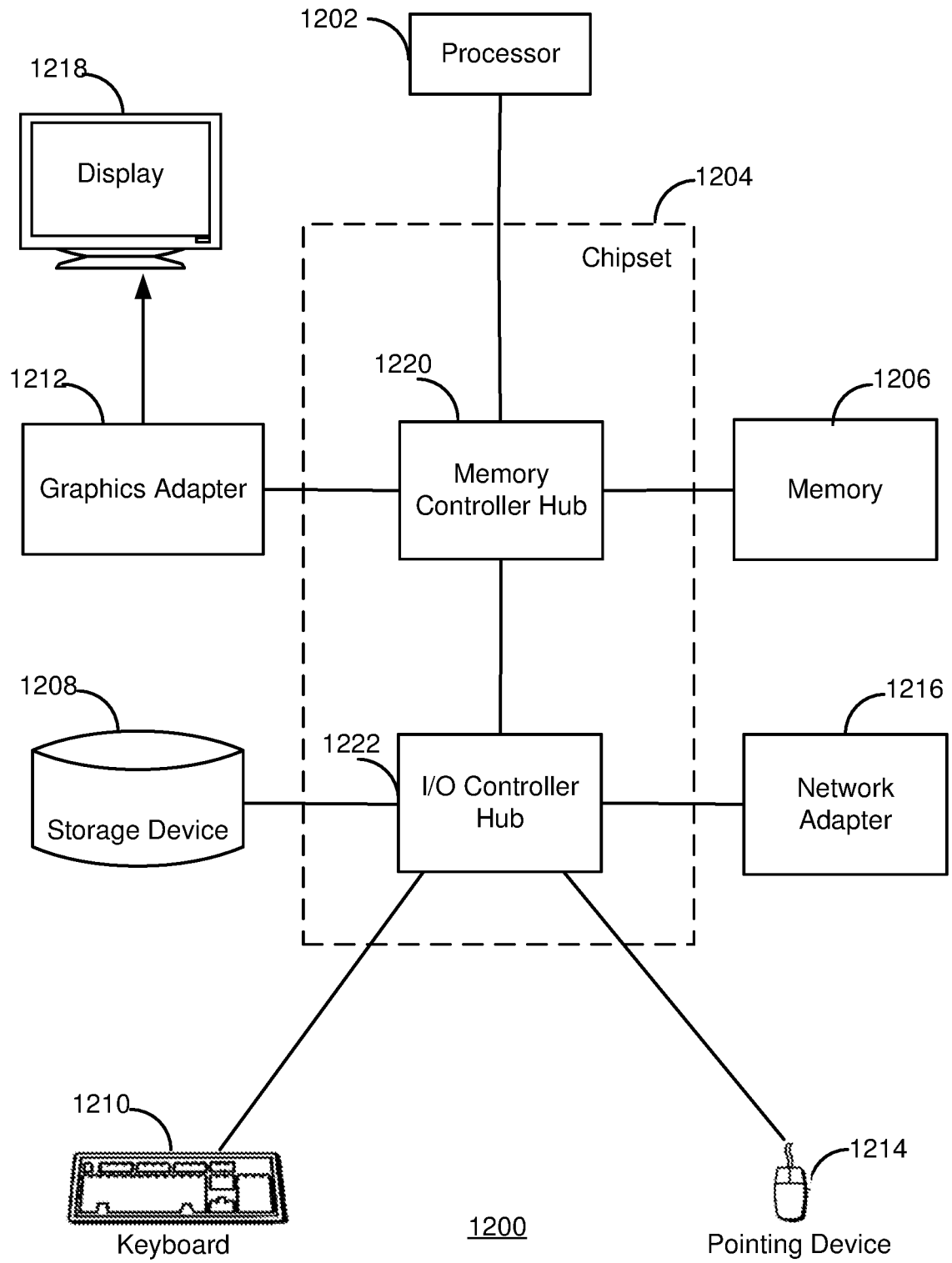
FIG. 15 is a block diagram illustrating a functional view of a typical computer system for use in the environment of FIG. 1 according to one embodiment.

FIG. 15 is a high-level block diagram illustrating a functional view of a typical computer system for use as one of the entities illustrated in the environment 100 of FIG. 1 according to an embodiment. Illustrated are at least one processor 1502 coupled to a chipset 1504. Also coupled to the chipset 1504 are a memory 1506, a storage device 1508, a keyboard 1510, a graphics adapter 1512, a pointing device 1514, and a network adapter 1516. A display 1518 is coupled to the graphics adapter 1512. In one embodiment, the functionality of the chipset 1504 is provided by a memory controller hub 1520 and an I/O controller hub 1522. In another embodiment, the memory 1506 is coupled directly to the processor 1502 instead of the chipset 1504.

The storage device 1508 is a non-transitory computer-readable storage medium, such as a hard drive, compact disk read-only memory (CD-ROM), DVD, or a solid-state memory device. The memory 1506 holds instructions and data used by the processor 1502. The pointing device 1514 may be a mouse, track ball, or other type of pointing device, and is used in combination with the keyboard 1510 to input data into the computer system 200. The graphics adapter 1512 displays images and other information on the display 1518. The network adapter 1516 couples the computer system 1500 to a network.

As is known in the art, a computer 1500 can have different and/or other components than those shown in FIG. 15. In addition, the computer 1500 can lack certain illustrated components. For example, a computer system 1500 acting as a multi-tenant system 110 may lack a keyboard 1510 and a pointing device 1514. Moreover, the storage device 1508 can be local and/or remote from the computer 1500 (such as embodied within a storage area network (SAN)).

The computer 1500 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 1508, loaded into the memory 1506, and executed by the processor 1502.

The types of computer systems 1500 used by the entities of FIG. 1 can vary depending upon the embodiment and the processing power used by the entity. For example, a client device 105 may be a mobile phone with limited processing power, a small display 1518, and may lack a pointing device 1514. The multi-tenant system 110 and the cloud platform 120, in contrast, may comprise multiple blade servers working together to provide the functionality described herein.

Additional Considerations

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes and may not have been selected to delineate or circumscribe the inventive subject matter. Accordingly, the disclosure of the embodiments is intended to be illustrative, but not limiting.

We claim:

1. A computer implemented method for configuring data centers in cloud platforms, the method comprising:
   receiving, a data center specification configured to generate a data center on any of a plurality of cloud platforms, wherein the data center specification is a cloud platform independent declarative specification describing one or more data center entities, wherein the data center specification specifies values of attributes of the one or more data center entities;
   receiving a customization specification that includes an override definition comprising:
      a filtering criterion based on one or more attributes associated with the one or more data center entities, and
      a value of an attribute for data center entities that match the filtering criterion;
   compiling the data center specification in combination with the customization specification to generate a cloud platform specific data center representation for creating the data center on a target cloud platform selected from the plurality of cloud platforms;
   sending the cloud platform specific data center representation to the target cloud platform, wherein the target cloud platform configures the data center based on whether the datacenter entity matches the filtering criterion.

2. The computer implemented method of claim 1, wherein the customization specification is a first customization specification, the override definition is a first override definition, the filtering criterion is a first filtering criterion, and the value of the attribute defined by the customization specification is a first value of the attribute, the method further comprising:
   receiving a second customization specification that includes a second override definition comprising:
      a second filtering criterion based on attributes associated with the data center entities, and
      a second value of the attribute for data center entities that match the filtering criterion; and
   compiling the data center specification along with the second customization specification to generate a second customized cloud platform specific data center representation, wherein the second customized cloud platform specific data center representation is configured to generate a data center such that:
      responsive to a first datacenter entity matching the second filtering criterion, the value of the attribute is determined according to the second customization specification, and
      responsive to a second datacenter entity failing to match the filtering criterion, the value of the attribute is determined according to the data center specification.

3. The computer implemented method of claim 2, wherein the second customized cloud platform specific data center representation is sent to a second cloud platform for generating a data center on the second cloud platform.

4. The computer implemented method of claim 1, wherein the filtering criterion specifies a set of values for an attribute associated with a data center entity such that a data center entity matches the filtering criterion if the attribute associated with the data center has a value within the set of values.

5. The computer implemented method of claim 1, wherein the filtering criterion comprises an expression based on one or more attributes associated with a data center entity.

6. The computer implemented method of claim 1, wherein the customization specification defines the value of the attribute by specifying an operation and a set of values, wherein the value of the attribute is determined by applying the operation to:
   a first value of the attribute determined based on the data center specification; and
   a second value of the attribute as specified by the customization specification.

7. The computer implemented method of claim 6, wherein the operation is one of:
   a replace operation;
   a union operation, or an
   an intersect operation.

8. The computer implemented method of claim 1, wherein the customization specification includes a plurality of override definitions, the method further comprising:
   determining that a data center entity matches a plurality of filtering criteria;
   determining a plurality of values for the attribute of the data center entity;
   performing conflict resolution to select a value from the plurality of values for assigning to the attribute.

9. The computer implemented method of claim 1, wherein the data center is for a tenant of a multi-tenant system, the method further comprising:
   providing users of the tenant with access to computing resources of the data center configured by the target cloud platform.

10. The computer implemented method of claim 1, wherein compiling the data center specification to generate a cloud platform specific data center representation, comprises:
   generating cloud platform independent detailed metadata representation of the data center from the data center specification, the cloud platform independent detailed metadata representation including identifiers for instances of data center entities specified in the data center specification.

11. The computer implemented method of claim 10, wherein compiling the data center specification to generate a cloud platform specific data center representation further comprises:
   generating a platform specific detailed metadata representation for the target cloud platform based on the cloud platform independent detailed metadata representation; and
   deploying the data center on the target cloud platform based on the platform specific detailed metadata representation.

12. The computer implemented method of claim 1, wherein the data center specification comprises definitions of one or more data center entities, wherein a data center entity includes one or more service groups, wherein a service group comprises a set of services.

13. The computer implemented method of claim 12, wherein a service group further specifies a set of clusters of computing nodes, wherein one or more services are associated with a cluster of computing nodes, wherein the data center deployed on the target cloud platform includes the cluster of computing nodes and executes the services on the computing nodes as specified in the data center specification.

14. The computer implemented method of claim 1, wherein the target cloud platform configures the data center such that:
   responsive to a first datacenter entity matching the filtering criterion, the value of the attribute is determined according to the customization specification, and
   responsive to a second datacenter entity failing to match the filtering criterion, the value of the attribute is determined according to the data center specification.

15. A non-transitory computer readable storage medium for storing instructions that when executed by a computer processor cause the computer processor to perform steps for configuring data centers in a cloud platform, the steps comprising:
   receiving, a data center specification configured to generate a data center on any of a plurality of cloud platforms, wherein the data center specification is a cloud platform independent declarative specification describing one or more data center entities, wherein the data center specification specifies values of attributes of the one or more data center entities;
   receiving a customization specification that includes an override definition comprising:
      a filtering criterion based on one or more attributes associated with the one or more data center entities, and
      a value of an attribute for data center entities that match the filtering criterion;
   compiling the data center specification in combination with the customization specification to generate a cloud platform specific data center representation for creating the data center on a target cloud platform selected from the plurality of cloud platforms;

sending the cloud platform specific data center representation to the target cloud platform, wherein the target cloud platform configures the data center based on whether the datacenter entity matches the filtering criterion.

16. The non-transitory computer readable storage medium of claim 15, wherein the customization specification is a first customization specification, the override definition is a first override definition, the filtering criterion is a first filtering criterion, and the value of the attribute defined by the customization specification is a first value of the attribute, the instructions further causing the computer processor to perform steps comprising:

receiving a second customization specification that includes a second override definition comprising:
a second filtering criterion based on attributes associated with the data center entities, and
a second value of the attribute for data center entities that match the filtering criterion; and compiling the data center specification along with the second customization specification to generate a second customized cloud platform specific data center representation, wherein the second customized cloud platform specific data center representation is configured to generate a data center such that:
responsive to a first datacenter entity matching the second filtering criterion, the value of the attribute is determined according to the second customization specification, and
responsive to a second datacenter entity failing to match the filtering criterion, the value of the attribute is determined according to the data center specification.

17. The non-transitory computer readable storage medium of claim 15, wherein the filtering criterion specifies a set of values for an attribute associated with a data center entity such that a data center entity matches the filtering criterion if the attribute associated with the data center has a value within the set of values.

18. The non-transitory computer readable storage medium of claim 15, wherein the filtering criterion comprises an expression based on one or more attributes associated with a data center entity.

19. The non-transitory computer readable storage medium of claim 15, wherein the customization specification defines the value of the attribute by specifying an operation and a set of values, wherein the value of the attribute is determined by applying the operation to:
a first value of the attribute determined based on the data center specification; and
a second value of the attribute as specified by the customization specification.

20. A computer system comprising:
a computer processor; and
a non-transitory computer readable storage medium for storing instructions that when executed by the computer processor, cause the computer processor to perform steps for configuring data centers in a cloud platform, the steps comprising:
receiving, a data center specification configured to generate a data center on any of a plurality of cloud platforms, wherein the data center specification is a cloud platform independent declarative specification describing one or more data center entities, wherein the data center specification specifies values of attributes of the one or more data center entities;
receiving a customization specification that includes an override definition comprising:
a filtering criterion based on one or more attributes associated with the one or more data center entities, and
a value of an attribute for data center entities that match the filtering criterion;
compiling the data center specification in combination with the customization specification to generate a cloud platform specific data center representation for creating the data center on a target cloud platform selected from the plurality of cloud platforms;
sending the cloud platform specific data center representation to the target cloud platform, wherein the target cloud platform configures the data center based on whether the datacenter entity matches the filtering criterion.

* * * * *